(12) United States Patent
Choi

(10) Patent No.: US 10,474,274 B2
(45) Date of Patent: Nov. 12, 2019

(54) ELECTRONIC DEVICE AND CONTROLLING METHOD THEREOF

(71) Applicant: Samsung Electronics Co., Ltd., Gyeonggi-do (KR)

(72) Inventor: Sun Yeong Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/873,259

(22) Filed: Jan. 17, 2018

(65) Prior Publication Data

US 2018/0203559 A1 Jul. 19, 2018

(30) Foreign Application Priority Data

Jan. 17, 2017 (KR) .......................... 10-2017-0008297

(51) Int. Cl.
| | |
|---|---|
| *G06F 3/041* | (2006.01) |
| *G06F 3/16* | (2006.01) |
| *G06F 3/0488* | (2013.01) |
| *G06F 3/01* | (2006.01) |
| *G06F 1/16* | (2006.01) |
| *G06F 3/0354* | (2013.01) |
| *H04S 7/00* | (2006.01) |
| *H04S 1/00* | (2006.01) |

(52) U.S. Cl.
CPC .......... *G06F 3/0414* (2013.01); *G06F 1/1605* (2013.01); *G06F 3/016* (2013.01); *G06F 3/03545* (2013.01); *G06F 3/04883* (2013.01); *G06F 3/165* (2013.01); *H04S 7/30* (2013.01); *H04R 2499/11* (2013.01); *H04S 1/00* (2013.01)

(58) Field of Classification Search
CPC .......................... G06F 3/165; G06F 3/041–047
See application file for complete search history.

(56) References Cited

U.S. PATENT DOCUMENTS

| | | | |
|---|---|---|---|
| 5,812,688 A | 9/1998 | Gibson | |
| 8,730,180 B2 | 5/2014 | Kim | |
| 9,344,622 B2 | 5/2016 | Kim | |
| 9,563,278 B2 | 2/2017 | Xiang et al. | |
| 2005/0135629 A1 | 6/2005 | Kim et al. | |
| 2005/0219211 A1* | 10/2005 | Kotzin ................. | G06F 1/1626 345/158 |
| 2009/0058829 A1* | 3/2009 | Kim ....................... | G06F 3/016 345/173 |

(Continued)

FOREIGN PATENT DOCUMENTS

| | | |
|---|---|---|
| EP | 2 891 955 | 7/2015 |
| EP | 3 021 207 | 5/2016 |

(Continued)

OTHER PUBLICATIONS

International Search Report dated Apr. 4, 2018 issued in counterpart application No. PCT/KR2017/015500, 12 pages.

(Continued)

*Primary Examiner* — Michael Pervan
(74) *Attorney, Agent, or Firm* — The Farrell Law Firm, P.C.

(57) ABSTRACT

An electronic device includes a speaker, an input device, and a processor electrically connected with the speaker and the input device. The processor adjusts the output of the speaker based on a generation location of the input signal received through the input device and the location of the speaker.

20 Claims, 16 Drawing Sheets

(56) References Cited

U.S. PATENT DOCUMENTS

| | | | |
|---|---|---|---|
| 2009/0143028 A1* | 6/2009 | Kim | H04B 17/27 455/90.2 |
| 2010/0046766 A1* | 2/2010 | Gregg | H04R 3/12 381/59 |
| 2010/0137027 A1 | 6/2010 | Kim | |
| 2011/0109577 A1* | 5/2011 | Lee | G06F 3/044 345/173 |
| 2011/0116665 A1 | 5/2011 | King et al. | |
| 2013/0044065 A1* | 2/2013 | Lee | H04M 1/03 345/173 |
| 2013/0077804 A1* | 3/2013 | Glebe | G06F 3/0488 381/109 |
| 2013/0154930 A1 | 6/2013 | Xiang et al. | |
| 2014/0210740 A1* | 7/2014 | Lee | G06F 3/0488 345/173 |
| 2014/0253775 A1 | 9/2014 | Kim | |
| 2014/0329567 A1 | 11/2014 | Chan et al. | |
| 2015/0193197 A1 | 7/2015 | Nahman et al. | |
| 2016/0132285 A1 | 5/2016 | Hawker et al. | |
| 2016/0170707 A1 | 6/2016 | Petainen | |
| 2016/0320847 A1 | 11/2016 | Coleman et al. | |
| 2017/0110101 A1* | 4/2017 | Cho | G10H 1/34 |
| 2017/0123550 A1* | 5/2017 | Lee | G06F 3/04883 |

FOREIGN PATENT DOCUMENTS

| | | |
|---|---|---|
| KR | 1020050064442 | 6/2005 |
| KR | 200396238 | 9/2005 |
| KR | 1020060007857 | 1/2006 |
| KR | 10-0640815 | 10/2006 |
| KR | 1020090023919 | 3/2009 |
| KR | 10-1462021 | 11/2014 |
| KR | 10-1544475 | 8/2015 |

OTHER PUBLICATIONS

European Search Report dated May 17, 2018 issued in counterpart application No. 18152105.5-1221, 11 pages.

* cited by examiner

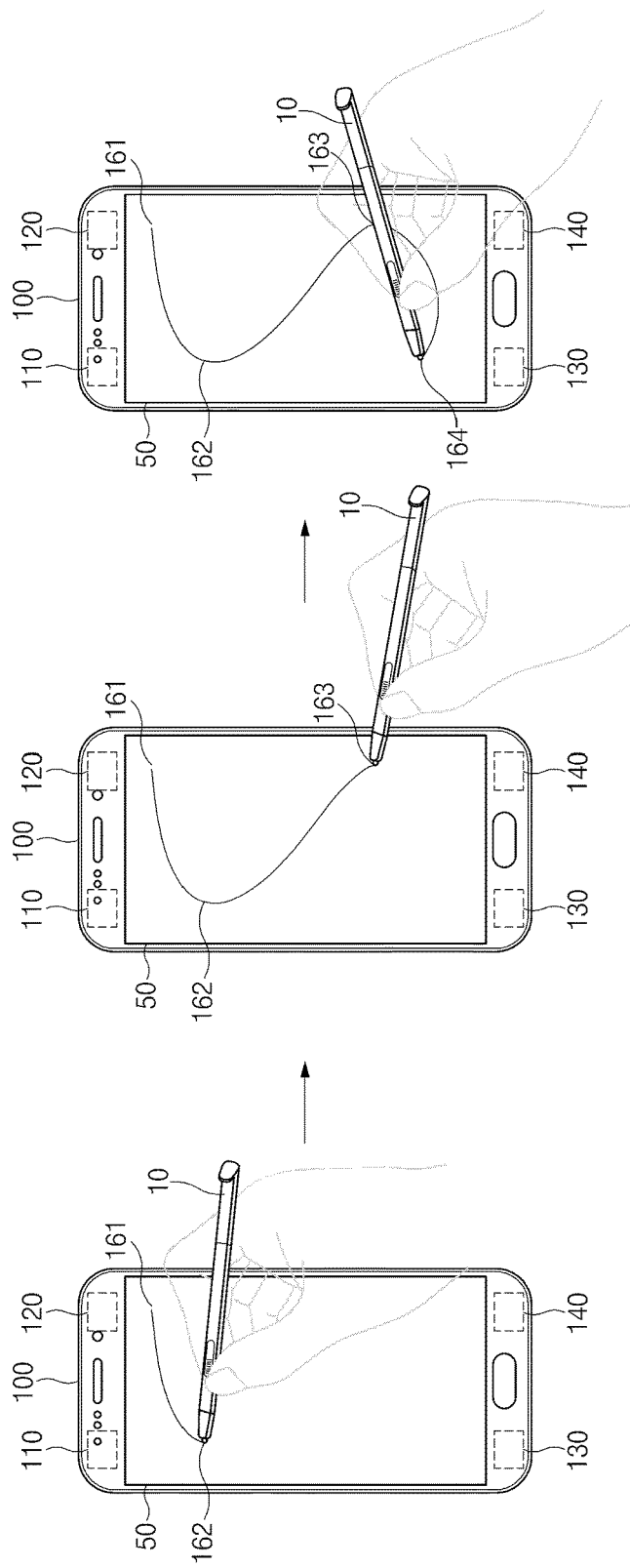

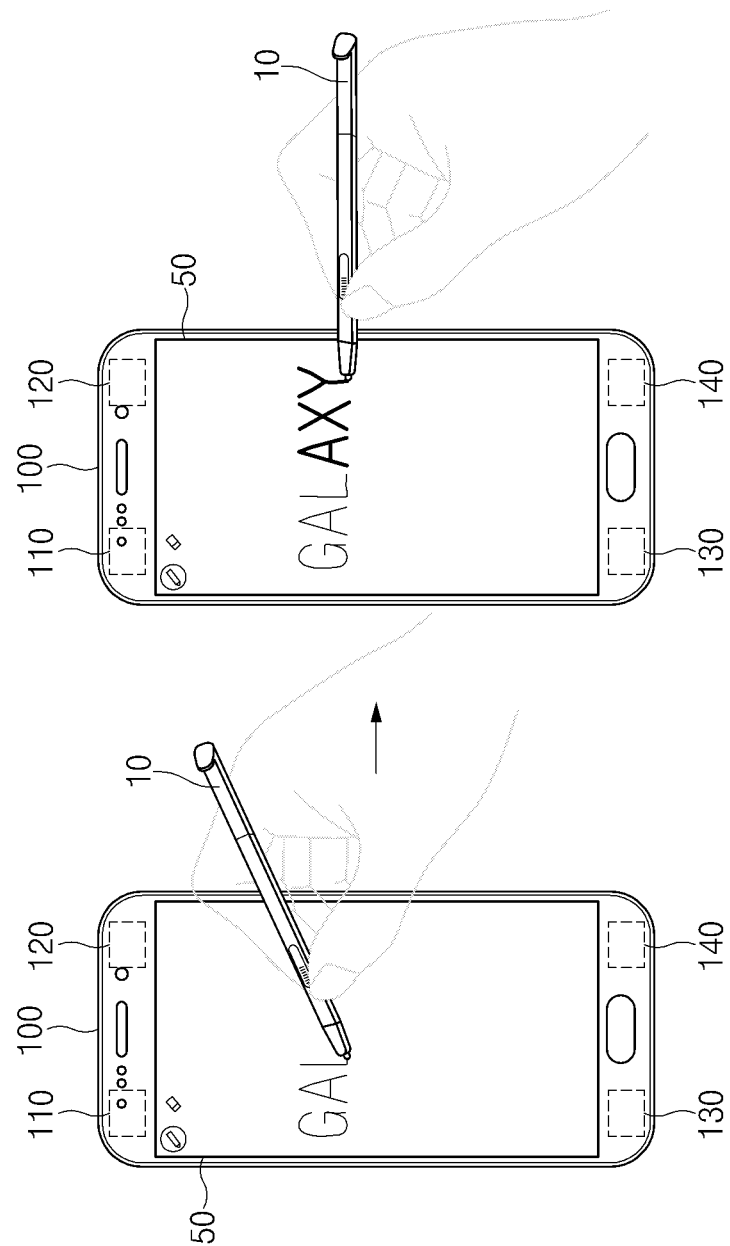

ELECTRONIC DEVICE AND CONTROLLING METHOD THEREOF

PRIORITY

This application claims priority under 35 U.S.C. § 119(a) to Korean Patent Application Serial No. 10-2017-0008297, which was filed in the Korean Intellectual Property Office on Jan. 17, 2017, the entire content of which is incorporated herein by reference.

BACKGROUND

1. Field of the Disclosure

The present disclosure relates generally to a method for adjusting the output of a speaker included in an electronic device, and more particularly, to the electronic device for adjusting the output of the speaker based on an input signal to an input device of the electronic device and an operating method of the electronic device.

2. Field of the Disclosure

With advances in technology, an electronic device, such as a smartphone, is able to provide more diverse functions that a user may perform, such as reproducing a video file and playing a game. Also, the user may input a memo to the electronic device by using an electronic pen.

When the user touches a display included in the electronic device by using the electronic pen or a part of their hand during execution of an application on the electronic device, the electronic device may generate a sound effect for the application. However, a speaker of the electronic device generates sound effects related to the user's input regardless of the location of the display, which makes feedback difficult for the user to implement.

SUMMARY

Aspects of the present disclosure are to address at least the above-mentioned problems and/or disadvantages and to provide at least the advantages described below. Accordingly, the present disclosure may generate an input signal of a user by using a display of an electronic device and may provide an output of a sound effect that varies depending on the distance between the speaker and the location at which a signal is input.

In accordance with an aspect of the present disclosure, an electronic device includes a speaker, an input device, and a processor electrically connected with the speaker and the input device. The processor adjusts an output of the speaker based on a generation location of an input signal received through the input device and a location of the speaker.

In accordance with another aspect of the present disclosure, a controlling method of an electronic device includes an input device and a speaker includes receiving an input signal through the input device; determining a generation location of the received input signal; calculating a distance between the generation location of the input signal and a location where the speaker is disposed; and adjusting an output of the speaker based on the calculated distance.

In accordance with another aspect of the present disclosure, a storage medium may store instructions performing a controlling method of an electronic device including an input device and a speaker, the controlling method including receiving an input signal through the input device, determining a generation location of the received input signal, calculating a distance between the generation location of the input signal and a location where the speaker is disposed, and adjusting an output of the speaker based on the calculated distance.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 1A to 1C are views illustrating a situation in which an electronic device adjusts the output of a speaker based on the speaker and the distance between the location of an input that an input device receives, according to an embodiment of the present disclosure;

FIGS. 8A and 8B are views illustrating a situation in which the electronic device adjusts the output of a speaker in response to an input of a force touch, according to an embodiment of the present disclosure;

DETAILED DESCRIPTION

Figure 2A:
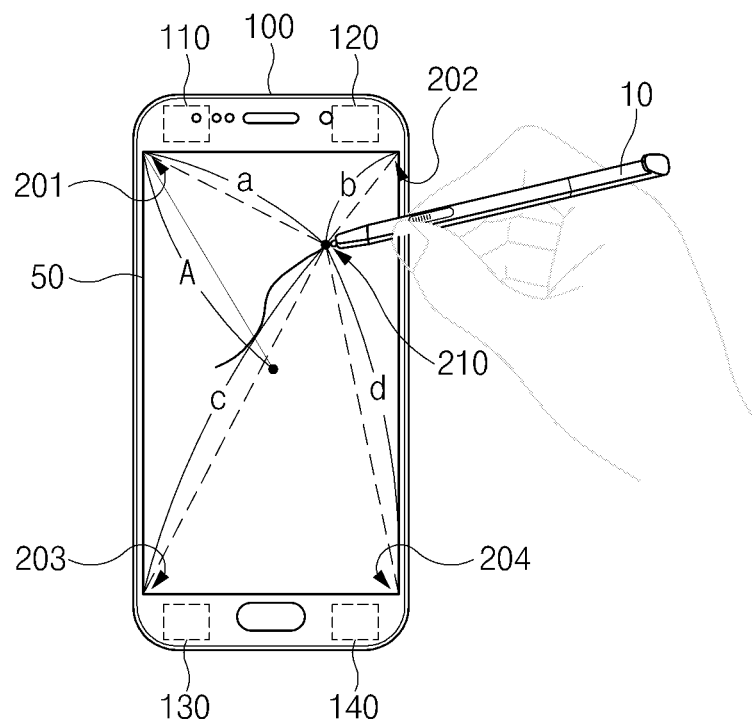
FIGS. 2A, to 2C are views illustrating a situation in which the electronic device determines the output of a speaker based on the distance between the speaker and the location of a signal input to an input device, according to an embodiment of the present disclosure.

Hereinafter, various embodiments of the present disclosure may be described with reference to accompanying drawings. Accordingly, those of ordinary skill in the art will recognize that modifications, equivalents, and/or alternatives of the various embodiments described herein can be made without departing from the scope and spirit of the present disclosure. With regard to description of the drawings, similar elements may be marked by similar reference numerals.

The terms of a singular form may include plural forms unless otherwise specified. In this disclosure, the expressions "A or B", "at least one of A and/or B", or "one or more of A and/or B", etc. may include any and all combinations of one or more of the listed items. The terms, such as "first", "second", etc. be used to refer to various elements regardless of the order and/or the priority, and to distinguish the relevant elements from other elements, but do not limit the elements. When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present.

The expression "configured to" may be used interchangeably with the expressions "suitable for", "having the capacity to", "adapted to", "made to", "capable of", or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

FIGS. 1A to 1C are views illustrating a situation in which an electronic device adjusts the output of a speaker based on the speaker and the distance between the location of an input that an input device receives, according to an embodiment of the present disclosure;

Referring to FIGS. 1A to 1C, an electronic device 100 may include, for example, at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a motion picture experts group (MPEG-1 or MPEG-2) audio layer 3 (MP3) player, a medical device, a camera, or a wearable device. The wearable device may include at least one of an accessory-type device (e.g., a watch, a ring, a bracelet, an anklet, a necklace, glasses, a contact lens, or a head-mounted device (HMD)), one-piece fabric or clothes type device (e.g., electronic clothes), a body-attached type device (e.g., a skin pad or a tattoo), or a bio-implantable type device (e.g., implantable circuit). The electronic device 100 may include, for example, at least one of a television (TV), a digital versatile disc (DVD) player, an audio player, a refrigerator, an air conditioner, a cleaner, an oven, a microwave oven, a washing machine, an air cleaner, a set-top box, a media box (e.g., Samsung HomeSync™, Apple TV™, or Google TV™), a game console (e.g., Xbox™ and PlayStation™), an electronic dictionary, an electronic key, a camcorder, or an electronic picture frame. Hereinafter, a description will be given under the assumption that the electronic device 100 is a smartphone.

The electronic device 100 may include one or more speakers. For example, the electronic device 100 may include a first speaker 110, a second speaker 120, a third speaker 130, and a fourth speaker 140. The speakers 110 to 140 may be, for example, an element of the electronic device 100 that outputs sound. The speakers 110 to 140 may be placed on sides of a surface on which a display 50 of the electronic device 100 is placed. However, embodiments of the present disclosure are not limited thereto. For example, the speakers 110 to 140 may be disposed on the surface on which the display 50 of the electronic device 100 is placed, on a surface opposite to the surface on which the display 50 is placed, etc. Hereinafter, a description will be given under assumption that the speakers 110 and 140 are placed on sides of the electronic device 100.

The electronic device 100 may include the display 50 receiving a touch input as an input device. The display 50 may be integrated with, for example, a touch panel and may receive a touch input from the user. Also, the electronic device 100 may include a pen sensor to receive an input using an electronic pen.

An input technology using the electronic pen may operate in, for example, a resistive manner, a capacitive manner, a passive manner, an active manner, an electromagnetic resonance (EMR) manner, an ultrasonic manner, etc.

In a resistive pen, a touch or handwriting input may be made by applying pressure to a resistive touch screen by using a sharp tip, but it is not possible to transfer handwriting pressure or pen pressure due to the low usability of the touch screen itself.

A capacitive pen may include a tip equipped with an elastic conductor (e.g., dielectric) and may make a touch and handwriting input through electrostatic reaction with a capacitive touch screen. For this reason, it is not possible to transfer pen pressure.

Since a passive type pen and an active type pen replace a finger role, it may not be possible to distinguish a finger touch and a pen touch. Also, since proximity sensing and palm rejection functions are not possible to implement, it may not be possible to use an existing touch screen device without change if a separate digitizer is not used.

Also, the passive type pen may use a tip having a thickness of 5 mm or more for the purpose of similarly implementing capacitance generated by a finger without using a separate battery or coil. In contrast, since the active type pen includes an embedded battery or coil, the active type pen may have a capacitance similar to a finger even though a thin tip of 2 mm is used.

Since a terminal is active and a pen is passive, the EMR type pen may make an input through electromagnetic induction using the terminal and an electromagnetic induction unit of the pen. To this end, a digitizer as a separate input may be built in a touch screen device. In this case, since it is possible to distinguish a finger touch and a pen touch, the proximity sensing and palm rejection functions may be implemented. Also, since various touch pressure levels are distinguishable, the pen may be implemented with a small size, but there is a need for an input means for recognizing a plurality of coordinates.

The ultrasonic method is a display way to output, at a pen, ultrasonic waves toward a display and receive the ultrasonic waves at a receiver placed under the display.

According to an embodiment of the present disclosure, the electronic device 100 may receive an input from the user using an electronic pen 10. The electronic device 100 may receive, for example, an input using the electronic pen 10 while a memo input application, a schedule application, etc. is being activated. However, the way for the electronic device 100 to receive an input of the electronic pen 10 is not limited thereto. For example, the electronic device 100 may receive an input using the electronic pen 10 even in a state where a display is deactivated.

The electronic device 100 according to an embodiment of the present disclosure may adjust the output of the speakers 110 to 140 based on the locations of the speakers 110 to 140 and the location where an input of the electronic pen 10 is generated.

For example, the electronic device 100 may determine the touch location of the electronic pen 10 based on a signal associated with the input location of the electronic pen 10, which is detected by a touch panel integrated with the display 50.

Also, the electronic device 100 may determine the locations of the speakers 110 to 140. For example, the electronic device 100 may set points on the display 50 adjacent to the locations of the speakers 110 to 140 to the locations of the speakers 110 to 140.

The electronic device 100 may determine the distances between the electronic pen 10 and the speakers 110 to 140 based on the determined current input location of the electronic pen 10 and the determined locations of the speakers 110 to 140, and may adjust the output of the speakers 110 to 140 depending on the determined distances.

According to an embodiment of the present disclosure, in the case of inputting letters on the display 50 by using the electronic pen 10, the electronic device 100 may output a sound effect similar to the sound generated when handwriting is actually made, through the speakers 110 to 140. In this case, the electronic device 100 may adjust the output of the speakers 110 to 140 to be different from each other based on the input location of the electronic pen 10.

For example, the electronic device 100 may apply a small weight to a speaker adjacent to the current input location of the electronic pen 10 and may apply a larger weight to a speaker distant from the current input location of the electronic pen 10. The speakers 110 to 140 may adjust the output depending on weights.

Referring to FIG. 1A, the electronic device 100 may receive an input using the electronic pen 10. The electronic device 100 may determine that the input location of the electronic pen 10 moves from the first location 161 to the second location 162.

According to an embodiment of the present disclosure, in the case where the electronic pen 10 is at the first location 161, the electronic device 100 may adjust the output of the second speaker 120 to be at the highest level, and may adjust the speaker output in the order of the first speaker 110, the fourth speaker 140, and the third speaker 130. In the case where the electronic pen 10 moves to the second location 162, the electronic device 100 may decrease the output of the second speaker 120. In this case, the electronic device 100 may set the output of the first speaker 110 to be at the highest level and may adjust the speaker output in the order of the second speaker 120, the third speaker 130, and the fourth speaker 140.

According to an embodiment of the present disclosure, the electronic device 100 may adjust the outputs of the speakers 110 to 140 based on the movement of the electronic pen 10 as described above. For example, the electronic device 100 may start to decrease the output of the second speaker 120 based on when the electronic pen 10 starts to move from the first location 161 to the second location 162. The electronic device 100 may decrease the output of the second speaker 120 until the electronic pen 10 stops the movement at the second location 162 or changes a progress direction. Likewise, the electronic device 100 may adjust the output of any other speaker based on the movement of the electronic pen 10. Accordingly, the electronic device 100 may generate a sound effect that is similar to handwriting actually made from the first location 161 to the second location 162.

Referring to FIG. 1B, the electronic device 100 may determine that the input location of the electronic pen 10 moves from the second location 162 to the third location 163.

According to an embodiment of the present disclosure, in the case where the electronic pen 10 is at the second location 162, the electronic device 100 may adjust the output of the first speaker 110 to be at the highest level and may adjust the speaker output in the order of the second speaker 120, the third speaker 130, and the fourth speaker 140. In the case where the electronic pen 10 moves to the third location 163, the electronic device 100 may decrease the output of the first speaker 110. In this case, the electronic device 100 may adjust the output of the fourth speaker 140 to be at the highest level and may adjust the speaker output in the order of the third speaker 130, the second speaker 120, and the first speaker 110.

Referring to FIG. 1C, the electronic device 100 may determine that the input location of the electronic pen 10 moves from the third location 163 to a fourth location 164.

According to an embodiment of the present disclosure, in the case where the electronic pen 10 is at the third location 163, the electronic device 100 may adjust the output of the fourth speaker 140 to be at the highest level and may adjust the speaker output in the order of the third speaker 130, the second speaker 120, and the first speaker 110. In the case where the electronic pen 10 moves to the fourth location 164, the electronic device 100 may decrease the output of the fourth speaker 140. In this case, the electronic device 100 may adjust the output of the third speaker 130 to be at the highest level and may adjust the speaker output in the order of the fourth speaker 140, the first speaker 110, and the second speaker 120.

As such, the electronic device 100 may output sound differentially based on the distance between the input location of the electronic pen 10 and the speakers 110 to 140, thus generating an effect similar to handwriting made on an actual paper.

Figure 2C:
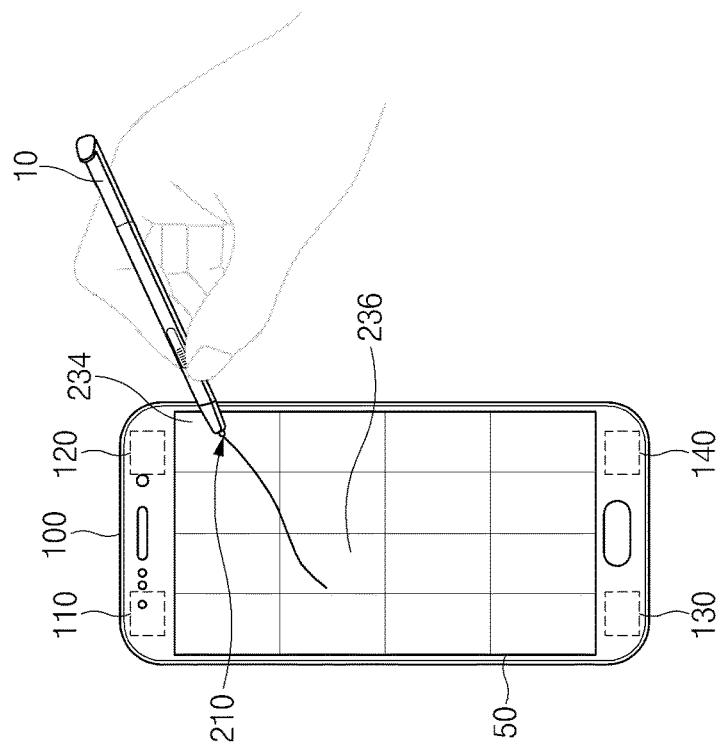
Figure 2B:
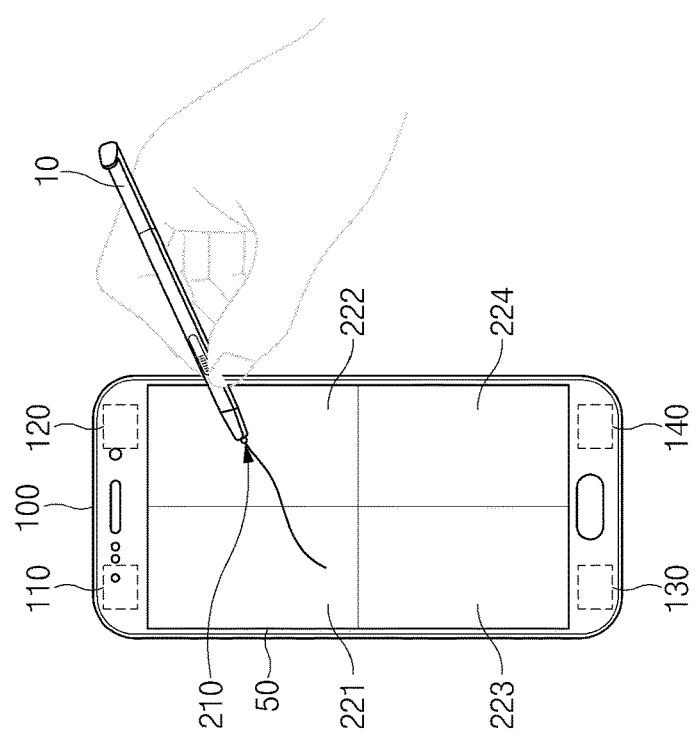

FIGS. 2A to 2C are views illustrating a situation in which an electronic device according to an embodiment of the present disclosure determines the output of a speaker based on the distance between the location of an input signal and the speaker.

According to an embodiment of the present disclosure, a sound output level of the electronic device 100 may be adjusted roughly from 0 to 15 levels. The electronic device 100 may make an adjustment from 1 to 2 decibels (dB) for each sound output level. Alternatively, the electronic device 100 may make an adjustment from 3 to 5 dB for each sound output level. However, the output level is not limited thereto.

Referring to FIG. 2A, the electronic device 100 may determine the input location of the electronic pen 10. The electronic device 100 according to an embodiment of the present disclosure may determine the distances between the speakers 110 to 140 and the input location of the electronic pen 10 based on the input location and may adjust the output of the speakers 110 to 140 based on the determined distances. Locations of the speakers 110 to 140 may be respectively set to points 201 to 204 on the display 50, which are respectively adjacent to the speakers 110 to 140. The electronic device 100 may adjust, for example, the output of the speakers 110 to 140 by adjusting weights to be input to the amplifiers of the respective speakers 110 to 140.

According to an embodiment of the present disclosure, the electronic device 100 may calculate the weights to be applied to the speakers 110 to 140 by using the following Equation (1) and may adjust the output of the speakers 110 to 140.

$$V' = V + \left(\frac{-20 * \log_{10} \frac{k}{A}}{D}\right) \quad (1)$$

where:

V' is the adjusted sound output level

V is the current sound output level

A is the point at which the distance from each speaker is the same (e.g., a central point of a display)

k is the distance between the user input location and each speaker

D is the output sound level in dB

A way for the electronic device 100 according to an embodiment of the present disclosure to determine weights of the speakers 110 to 140 depending on the touch input location may use various equations without being limited to Equation (1).

Referring to FIG. 2A, the size of the display 50 of the electronic device 100 may be 14.3 cm wide and 19.2 cm long. The distances from each of the points 201 to 204 to the point "A" at which the distance from each speaker is the same may be calculated to be 11.97 cm. Under the assumption that the sound output level "V" currently set by a user is 12 dB, "D" from a first sound output level (level-1) is 3 dB, the distance "k" from each of the speakers 110 to 140 to a current input point 210 of the electronic pen 10 is as illustrated in the following table 1. The electronic device 100 may calculate an adjusted sound output level for each of the speakers 110 to 140 by using the Equation (1).

The distance "k" from each of the speakers 110 to 140 to the current input point 210 of the electronic pen 10. The distance from the first speaker 110 to the input point 210 may correspond to "a", the distance from the second speaker 120 to the input point 210 may correspond to "b", the distance from the third speaker 130 to the input point 210 may correspond to "c", and the distance from the fourth speaker 140 to the input point 210 may correspond to "d".

TABLE 1

| Speaker Number | k (cm) | Weight to sound output at central point of display (dB) | Adjusted sound output level (V') |
| --- | --- | --- | --- |
| First speaker | 11.5 | 0.27277172 | 12.09092391 |
| Second speaker | 5.2 | 7.24186432 | 14.41395488 |
| Third speaker | 19.6 | −4.283189922 | 10.57007003 |
| Fourth speaker | 16.7 | −2.892397918 | 11.03586736 |

Referring to Table 1, the electronic device 100 may compute a weight to be applied to a current output for each of the speakers 110 to 140 to calculate an adjusted sound output level for each of the speakers 110 to 140.

The electronic device 100 according to an embodiment of the present disclosure may periodically calculate the above-described weight based on movement of the input location where an input of the electronic pen 10 is generated and may adjust the output for each of the speakers 110 to 140 based on the calculated result.

According to an embodiment of the present disclosure, in the case of a sound output system that may express the sound output by using only a sound output level, the electronic device 100 may discard values below a decimal point from the adjusted sound output level and may adjust the sound output level by using real positive values. Also, in the case of a sound output where the level is linearly adjusted, the electronic device 100 may apply the calculated value without change.

FIG. 2B is an embodiment of the present disclosure in which an electronic device calculates a weight of a speaker depending on the input location of an input device.

Referring to FIGS. 2B and 2C, the electronic device 100 may divide the display 50 into regions and may determine the input location of the electronic pen 10 based on the divided regions of the display 50. In this case, the electronic device 100 may adjust the weights of the speakers 110 to 140 based on a region where the input location of the electronic pen 10 is determined.

Referring to FIG. 2B, the electronic device 100 may divide the display 50 into 4 regions. In this case, the electronic device 100 may adjust the output of each of the speakers 110 to 140 in 3 levels.

For example, the input location 210 of the electronic pen 10 may move from the first region 221 to the second region 222. In the case where an input of the electronic pen 10 is in the first region 221, the electronic device 100 may apply the highest level-3 weight to the first speaker 110, may apply a level-2 weight to the second speaker 120 and the third speaker 130, and may apply the lowest level-1 weight to the fourth speaker 140.

In the case where the input of the electronic pen 10 moves to the second region 222, the electronic device 100 may apply the highest level-3 weight to the second speaker 120. In this case, depending on the distances, the electronic device 10 may apply the level-2 weight to the first speaker 110 and the fourth speaker 140 and may apply the lowest level-1 weight to the third speaker 130.

According to an embodiment of the present disclosure, in the case where the input of the electronic pen 10 moves to the second region 222, the electronic device 100 may apply a weight for increasing the output of the second speaker 120, may not apply a weight to the first speaker 110 and the fourth speaker 140, and may apply a weight for decreasing the output of the third speaker 130. That is, the output of a speaker adjacent to a region in which an input of the electronic pen 10 is located may increase. Also, depending on the distances, the outputs of the other speakers may maintain their current states or may decrease.

Referring to FIG. 2C, the electronic device 100 may divide the display 50 into 16 regions. In this case, the electronic device 100 may adjust the output of each of the speakers 110 to 140 in 7 levels. However, a weight level is not limited thereto.

The current input location 210 of the electronic pen 10 may move from a sixth region 236 to a fourth region 234. In the case where the input of the electronic pen 10 is in the sixth region 236, the electronic device 100 may apply a level-6 weight to the first speaker 110, may apply a level-4 weight to the second speaker 120, may apply the level-4 weight to the third speaker 130, and may apply a level-3 weight to the fourth speaker 140.

In the case where the input of the electronic pen 10 moves to the fourth region 234, the electronic device 100 may apply the highest level-7 weight to the second speaker 120. In this case, depending on the distances, the electronic device 100 may apply the level-4 weight to the first speaker 110 and the fourth speaker 140, and may apply the lowest level-1 weight to the third speaker 130.

According to an embodiment of the present disclosure, in the case where the input of the electronic pen 10 moves to the fourth region 234, the electronic device 100 may apply a weight for increasing the output to the second speaker 120, may not apply a weight to the first speaker 110 and the fourth speaker 140, and may apply a weight for decreasing the output to the third speaker 130. That is, the output of a speaker adjacent to a region in which an input of the electronic pen 10 is located may increase. Also, depending on the distances, the output of the other speakers may maintain current states or may decrease.

As the display 50 is subdivided, the electronic device 100 may adjust the speaker output more finely depending on the input location of the electronic pen 10.

As such, the electronic device 100 according to an embodiment of the present disclosure may periodically calculate the above-described weight based on a change in the input location where an input of the electronic pen 10 is generated and may adjust the output of each of the speakers 110 to 140 based on the calculated result.

Figure 3:
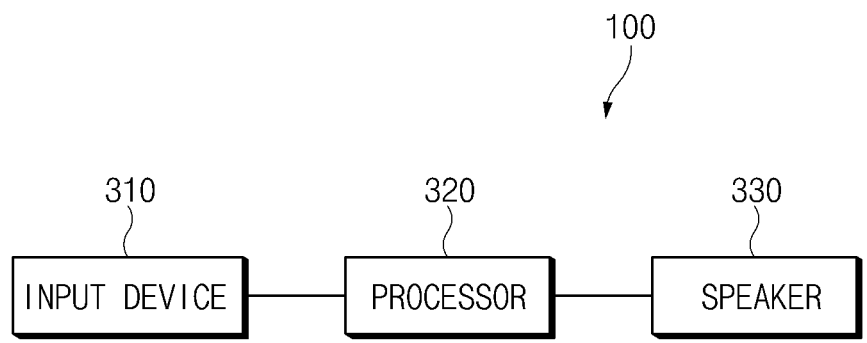
FIG. 3 is a schematic block diagram of the electronic device, according to an embodiment of the present disclosure.

FIG. 3 is a schematic block diagram of an electronic device according to an embodiment of the present disclosure.

Referring to FIG. 3, the electronic device 100 may include an input device 310, a processor 320, and a speaker 330. However, the electronic device 100 may be implemented to further include elements not illustrated in FIG. 3 or remove at least one of the elements illustrated in FIG. 3. For example, the electronic device 100 may be configured to include an element such as a sensor module (e.g., a gesture sensor, a gyro sensor, etc.), a power supply, etc. Also, the electronic device 100 may be configured to include a memory that is able to store a command or data associated with at least one other element of the electronic device 100.

The input device 310 may include, for example, a touch panel, a pen sensor, a physical key, etc. However, the type of the input device 310 is not limited thereto. For example, the input device 310 may include various devices that receive an input of a user and transfer an input signal to the processor 320.

The input device 310 according to an embodiment of the present disclosure may receive an input signal that is generated based on behavior of a user. The input device 310 may transmit, to the processor 320, the received input signal and information about the location where the input signal is generated.

The processor 320 may drive, for example, an operating system (OS), or an application to control a plurality of hardware or software elements connected to the processor 320, and may process and compute a variety of data.

The processor 320 according to an embodiment of the present disclosure may adjust the output of the speaker 330 based on the location of the speaker 330 and the location where an input signal received through the input device 310 is generated. For example, the processor 320 may apply a weight associated with the speaker output to an amplifier electrically connected to the speaker 330 such that the output of the speaker 330 is adjusted.

The speaker 330 may be, for example, a device that outputs sound generated in the electronic device 100. The speaker 330 may be included in, for example, an audio module. The electronic device 100 may include at least one or more speakers 330. One or more speakers 330 may output sound under control of the processor 320.

Figure 4:
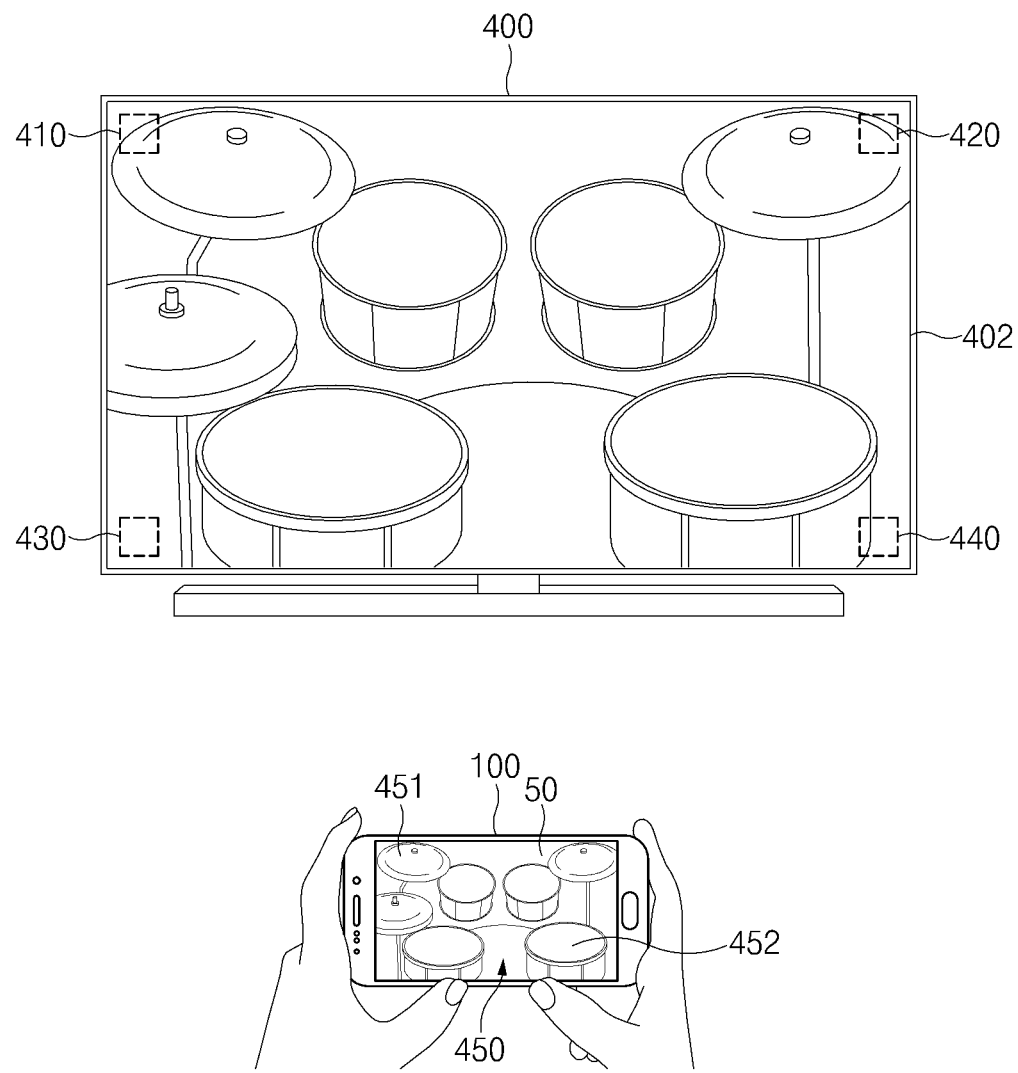
FIG. 4 is a view illustrating a situation in which the electronic device communicates with an external electronic device to adjust the output of a speaker of the external electronic device, according to an embodiment of the present disclosure.

FIG. 4 is a view illustrating a situation in which an electronic device communicates with an external electronic device to adjust the output of a speaker of the external electronic device according to an embodiment of the present disclosure.

Referring to FIG. 4, the electronic device 100 may establish communication with an external electronic device 400 by using a communication interface. The electronic device 100 and the communication interface of the external electronic device 400 may establish a network through wired communication or wireless communication.

The wireless communication may include cellular communication including at least one of, for example, long-term evolution (LTE), LTE advance (LTE-A), code division multiple access (CDMA), wideband CDMA (WCDMA), a universal mobile telecommunications system (UMTS), wireless broadband (WiBro), global system for mobile communications (GSM), etc. According to an embodiment of the present disclosure, the wireless communication may include at least one of, for example, wireless fidelity (Wi-Fi), Bluetooth™, Bluetooth low energy (BLE), Zigbee, near field communication (NFC), magnetic secure transmission, a radio frequency (RF), or a body area network (BAN).

The wired communication may include at least one of, for example, a universal serial bus (USB), a high definition multimedia interface (HDMI), a recommended standard-232 (RS-232), power line communication, a plain old telephone service (POTS), etc.

The electronic device 100 may adjust the outputs of speakers 410 to 440 included in the external electronic device 400 by using the above-described network. The speakers 410 to 440 may be disposed on sides of a surface on which a display 402 of the external electronic device 400 is disposed. However, embodiments of the present disclosure are not limited thereto.

For example, the speaker output from the external electronic device 400 may be adjusted based on the location of a signal input to an input device of the electronic device 100.

For example, in the case where the external electronic device 400 is a monitor or a TV, a user may use the electronic device 100 as a control unit for a game and may use a screen of the monitor or TV as a screen for the game. In this case, the electronic device 100 that functions as the control unit may display icons 450 for the game on the display 50. The icons 450 may be icons for selecting drums included in the game displayed on the display 402 of the external electronic device 400 and generating the sound of the selected drum(s).

According to an embodiment of the present disclosure, the electronic device 100 may increase the output of the first speaker 410 included in the external electronic device 400 based on when a first drum 451 is selected. If the electronic device 100 transmits a signal indicating selection of the first drum 451 to the external electronic device 400, the external electronic device 400 may increase the output of the first speaker 410 based on that the received signal. Also, the electronic device 100 may increase the output of the fourth speaker 440 of the external electronic device 400 based on when a second drum 452 is selected. The electronic device 400 may include the second speaker 420 and the third speaker 430.

According to an embodiment of the present disclosure, the electronic device 100 may determine location information of the speakers 410 to 440 of the external electronic device 400 and may generate the output of a speaker, which corresponds to the location of an input made to an input device of the electronic device 100, based on the speaker location information.

According to an embodiment of the present disclosure, the electronic device 100 may change a speaker corresponding to the input location, based on the determined speaker location information of the external electronic device 400. For example, when the first drum 451 is selected, the electronic device 100 may increase the output of the second speaker 420 based on an input of a signal to change settings.

The electronic device 100 may adjust the output of a speaker based on the drums that are selected, for example, based on the distance from a speaker adjacent to the location of a selected drum.

Figure 5A:
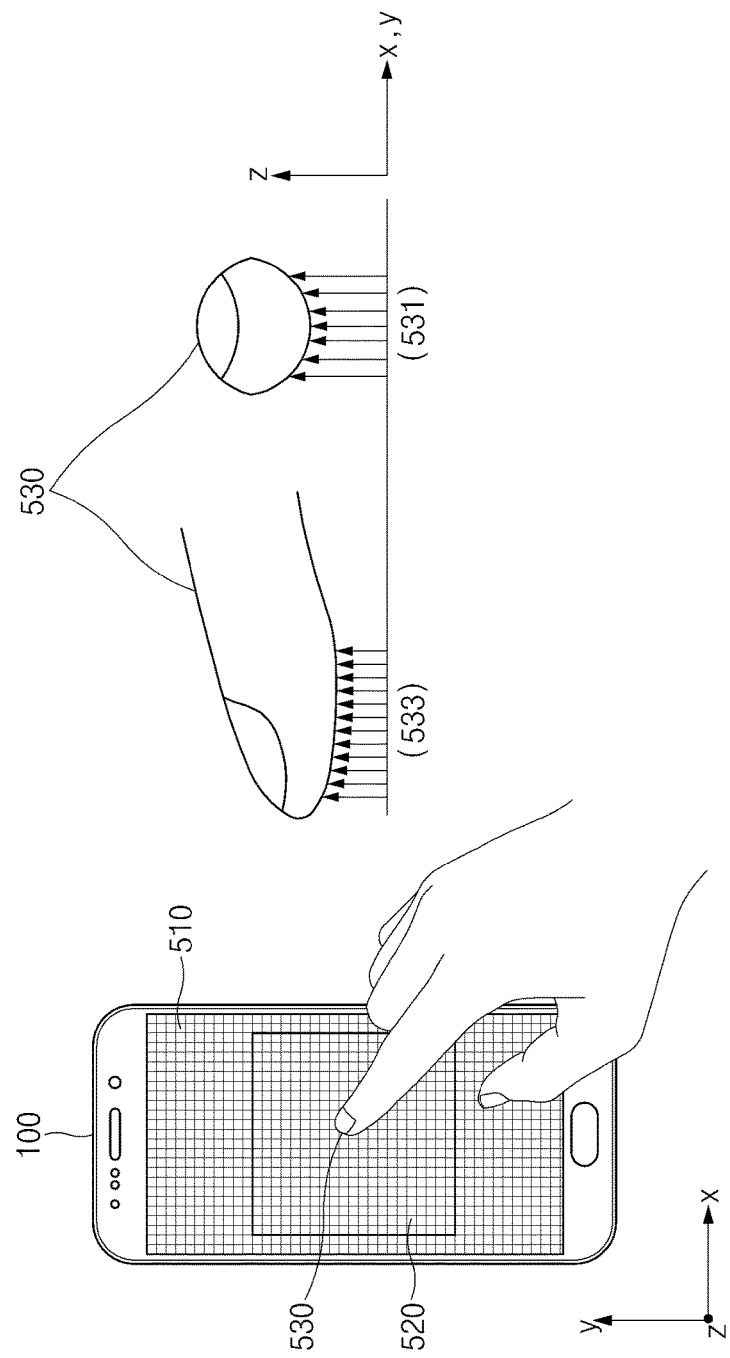
FIGS. 5A and 5B are views illustrating a method for measuring the height of a finger by using a display of the electronic device, according to an embodiment of the present disclosure.
Figure 5B:
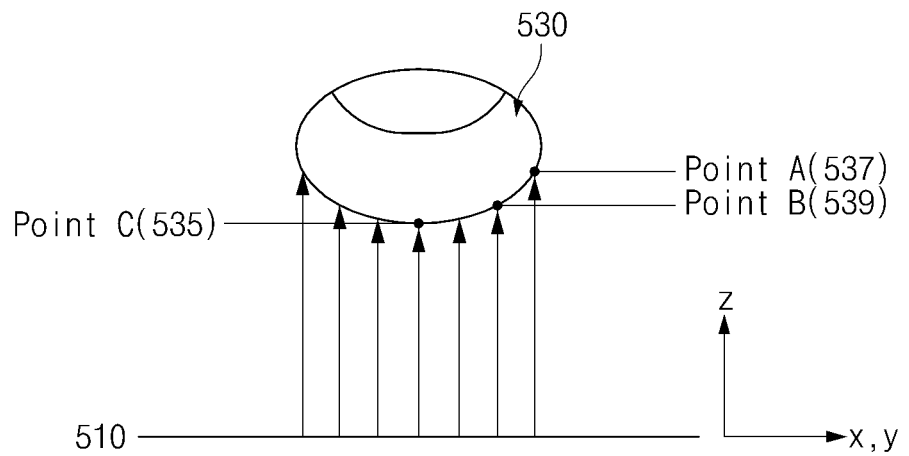

FIGS. 5A and 5B are views illustrating a method for measuring the height of a finger by using a display of an electronic device according to an embodiment of the present disclosure.

Referring to FIG. 5A, the electronic device 100 may generate shape information of an object close to a display 510. The display 510 may include the display 50. The display 510 of the electronic device 100 may include a touch panel recognizing a touch and a display unit displaying an image. According to an embodiment of the present disclosure, the display 510 may be implemented such that the touch panel and the display unit are stacked.

In the case where the touch panel is implemented as a capacitance type panel, the display 510 may support an input by an object capable of causing a change in capacitance, such as a finger, an electronic pen, etc. In particular, the touch panel may sense a change in capacitance due to a change in the height of an object (or the height difference between the touch panel and the object) and may measure the heights of at least some points of the object by using the change in capacitance.

If the object capable of causing a change in capacitance hovers on the display 510, the display 510 may receive an input associated with the hovering. The input associated with the hovering may include at least one coordinate (e.g., x, y, z). A touch integrated circuit (IC) of the touch panel may sense the hovering, may determine a hovering region on the display 510, and may transfer the coordinates (e.g., x, y) included in the hovering region to a processor 320. Here, the coordinates (e.g., x, y) included in the hovering region may correspond to a pixel unit. Additionally, the display 510 may sense the height corresponding to at least one point (e.g., x, y) of the hovering object and may transfer a coordinate "z" associated with the sensed height to the processor 320. Meanwhile, the coordinates (e.g., x, y, z) associated with at least one point of the object sensed through the hovering may be used to generate the shape information of the object.

According to an embodiment of the present disclosure, the electronic device 100 may sense a hovering input associated with any object through the display 510. The electronic device 100 may obtain an x-coordinate and a y-coordinate of at least one point of the object through the hovering input. In detail, the electronic device 100 may accurately measure the height "z" of at least one point of an object region by making the intervals of the x- and y-coordinates smaller. In this case, the electronic device 100 may generate the shape information about the object more finely.

In an embodiment of the present disclosure, the electronic device 100 may activate only a partial region 520 of the display 510 to measure the coordinates of respective points of the object region. Accordingly, even though an object approaches the remaining region other than the activated region 520, the coordinates of at least one point of the object may not be measured because a hovering input is not sensed. However, embodiments of the present disclosure are not limited thereto. For example, the electronic device 100 may activate the entire region of the display 510.

The electronic device 100 may generate the shape information of the object by using the coordinates measured through the display 510. The shape information may be defined as information that is obtained by collecting the coordinates of points of the object region and three-dimensionally modeling the collected coordinates. Accordingly, it may be possible to generate the shape information more minutely and more finely by making the distances between points (e.g., x, y) for measuring the height "z" smaller.

In an embodiment of the present disclosure, the electronic device 100 may measure the coordinates for each point of an index finger 530 by using the display 510. The electronic device 100 may measure the height "z" in the first direction (e.g., an x-direction 531) of the index finger 530 and may measure the height "z" in the second direction (e.g., a y-direction 533) of the index finger 530. Accordingly, the electronic device 100 may generate shape information of the index finger 530 by using the measured coordinates (e.g., x, y, z) of each point.

FIG. 5B is a view associated with a method for setting a reference point of a finger by using a touchscreen of an electronic device to measure the coordinate difference of the reference point and another point, according to an embodiment of the present disclosure.

Referring to FIG. 5B, the electronic device 100 may measure the height of the finger 530 close to the display 510. The electronic device 100 may enter a hovering state when the finger 530 approaches within a specific distance from the display 510, and the electronic device 100 may measure the height between the display 510 and at least one point of the finger 530 in the hovering state. Meanwhile, the height "z" of each point may be measured according to how much the finger 530 approaches. Also, the x- and y-coordinates of each point may be measured according to the location where a hovering input is made. Accordingly, there is a need for a correction process for the purpose of generating the shape information of the finger 530 consistently.

The electronic device 100 may measure the coordinates of a reference point among points of the finger 530, and the coordinate difference between the reference point and at least one point of the remaining points. For example, the electronic device 100 may set point "C" 535 of an object closest to the display 510 to be the reference point. The electronic device 100 may model the finger 530 three-dimensionally by using the coordinate difference between the reference point (e.g., point "C" 535) and other points (e.g., point "A" 537 and point "B" 539). Accordingly, it may be possible to generate the same shape information three-dimensionally regardless of how much the finger 530 approaches. According to an embodiment of the present disclosure, the electronic device 100 may set an edge (e.g., point "A" 537) of the object to be the reference point.

Figure 6B:
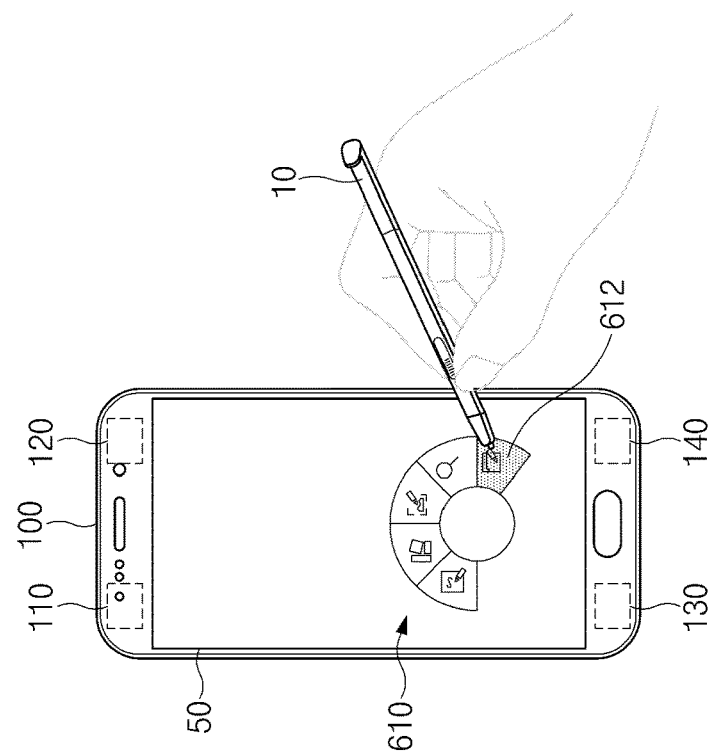
FIGS. 6A and 6B are views illustrating a situation in which the electronic device adjusts the output of a speaker based on the distance between the speaker and the user input location upon performing a hovering function, according to an embodiment of the present disclosure.
Figure 6A:
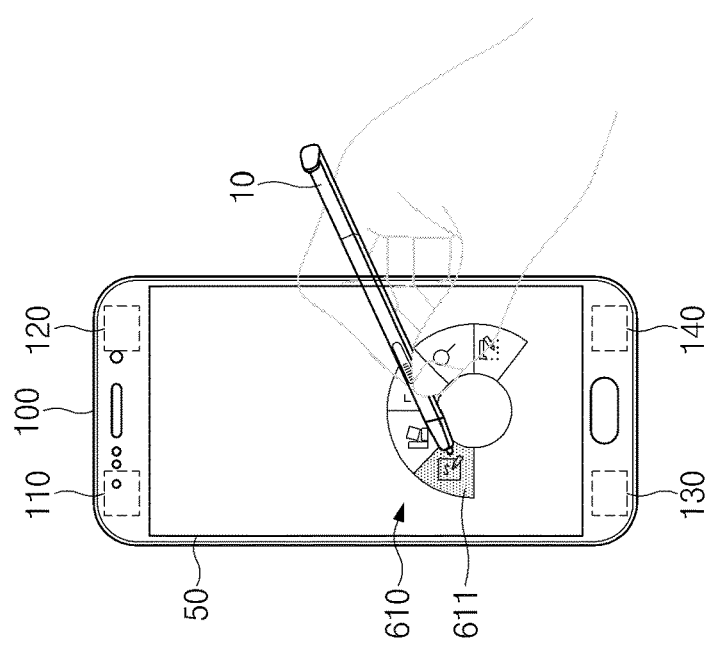

FIGS. 6A and 6B are views illustrating a situation in which an electronic device adjusts the output of a speaker based on the distance between the speaker and the user input location upon performing a hovering function, according to an embodiment of the present disclosure.

Referring to FIGS. 6A and 6B, the electronic device 100 according to an embodiment of the present disclosure may include one or more speakers. For example, the electronic device 100 may include the first speaker 110, the second speaker 120, the third speaker 130, and the fourth speaker 140. The speakers 110 to 140 may be placed on the sides of a surface on which the display 50 of the electronic device 100 is placed.

The electronic device 100 of FIGS. 6A and 6B may include the display 50 receiving a hovering input described with reference to FIGS. 5A and 5B as one of the input devices. The display 50 may support an input by an object capable of causing a change in capacitance, such as a finger, an electronic pen, etc. In particular, the touch panel may sense a change in capacitance due to a change in the height of an object and may measure the heights of at least some points of the object by using the change in capacitance.

The electronic device 100 according to an embodiment of the present disclosure may adjust the output of the speakers 110 to 140 based on the locations of the speakers 110 to 140 and the location where an input of the electronic pen 10 is generated.

For example, the electronic device 100 may apply a small weight to a speaker adjacent to the current input location of the electronic pen 10 and may apply a larger weight to a speaker distant from the current input location of the electronic pen 10.

Referring to FIG. 6A, the electronic device 100 may receive an input using the electronic pen 10.

For example, if the physical key included in the electronic pen 10 is pressed while the electronic pen 10 is separated by a specific distance from the display 50, the electronic device 100 may display an item 610 providing a plurality of functions. The item 610 providing the plurality of functions may be, for example, a collection of various functions that a user performs by using the electronic pen 10.

If the electronic pen 10 hovers on a location, at which at least one function of the functions included in the item 610 is displayed, without contact with the location, the electronic device 100 may display the at least one function to be distinguished from other surrounding functions. For example, in the case where the electronic pen 10 hovers on the location of the first function 611, the electronic device 100 may display a background color of an icon indicating the first function 611. According to an embodiment of the present disclosure, the electronic device 100 may display the icon of the first function 611 to be larger than before the user hovered over the icon.

The electronic device 100 according to an embodiment of the present disclosure may output sound effects based on which functions are selected by the hovering of the electronic pen 10. In this case, the electronic device 100 may adjust the output of a speaker producing the sound effect, based on the distance between the speaker and the location at which a function selected through the hovering of the electronic pen 10 is displayed.

For example, in the case where the electronic pen 10 hovers on the location of the first function 611, the electronic device 100 may increase the output of the third speaker 130 adjacent to the location at which the first function 611 is displayed and may increase the speaker output in the order of the fourth speaker 140, the first speaker 110, and the second speaker 120.

Referring to FIG. 6B, in the case where the electronic pen 10 hovers on the location of the second function 612, the electronic device 100 may increase the output of the fourth speaker 140 adjacent to the location at which the second function 612 is displayed and may increase the speaker output in the order of the third speaker 130, the second speaker 120, and the first speaker 110.

According to an embodiment of the present disclosure, if the hovering location of the electronic pen 10 moves from the location at which the first function 611 is displayed to the location at which the second function 612 is displayed, the electronic device 100 may periodically sense (or detect) the hovering location of the electronic pen 10 to adjust the output of the speakers 110 to 140.

According to various embodiments of the present disclosure, the electronic device 100 may adjust the output of the speakers 110 to 140 based on a difference between the heights at which the electronic pen 10 is hovering. For example, if the hovering location of the electronic pen 10 moves from the location at which the first function 611 is displayed in the direction in which the electronic pen 10 is close to the display 50, the electronic device 100 may adjust the output of the speakers 110 to 140 to increase. Also, if the electronic pen 10 moves in the direction in which the distance from the display 50 increases, the electronic device 100 may adjust the output of the speakers 110 to 140 to decrease.

As such, the electronic device 100 may adjust the speaker output based on the hovering location of the electronic pen 10, etc., and the location of a speaker.

Figure 7B:
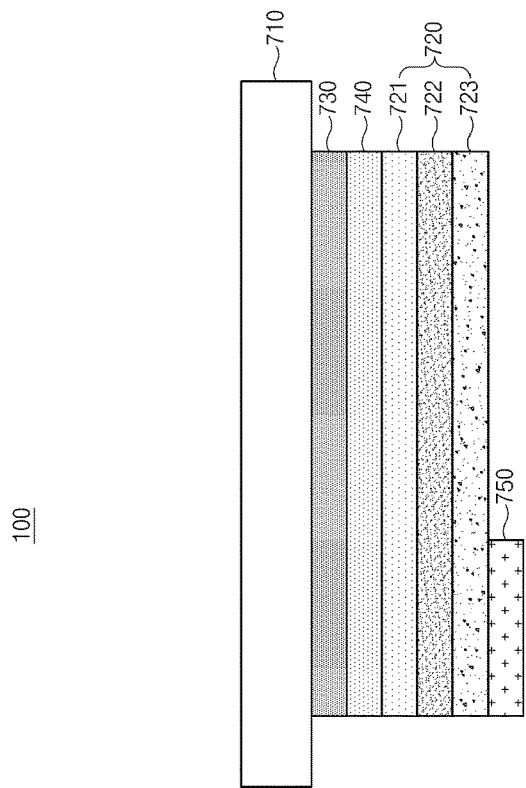
FIGS. 7A and 7B are views illustrating a stacked structure included in a display of the electronic device supporting a force touch function, according to an embodiment of the present disclosure.
Figure 7A:
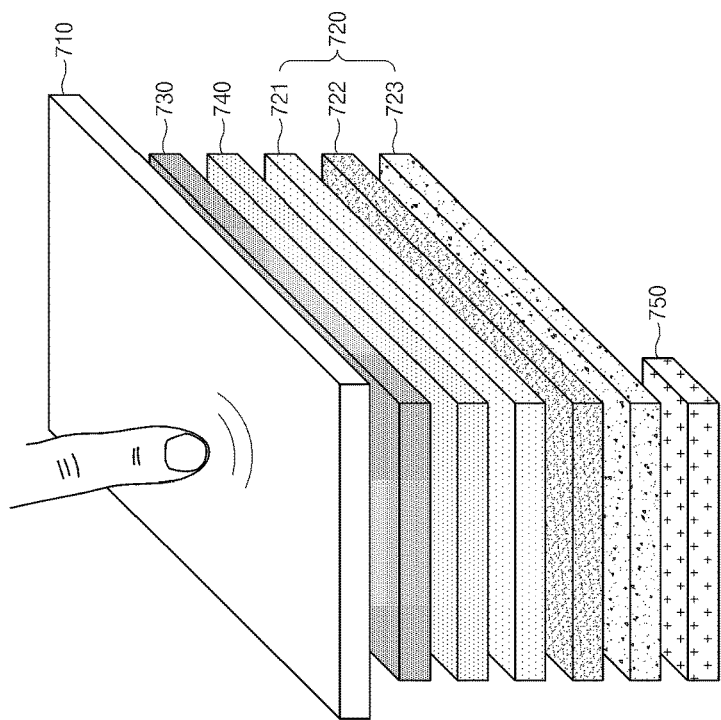

FIGS. 7A and 7B are views illustrating a stacked structure included in a display of an electronic device supporting a force or pressure touch function according to an embodiment of the present disclosure.

Referring to FIGS. 7A and 7B, the electronic device 100 may include a window 710, a touch sensor 730, a display unit 740, a pressure sensor 720, and a haptic actuator 750. The stacked structure may also be applied to various external electronic devices described in the present disclosure.

In the stacked structure of a display according to an embodiment of the present disclosure, the window 710 may be disposed in an internal space between the front surface (e.g., a first surface) of the disposed electronic device 100 and the rear surface (e.g., a second surface) of a housing. The window 710 may be exposed through the front surface (e.g., the first surface) of the electronic device 100 and may transmit light generated by the display unit 740.

A user may perform a "touch" (e.g., contact using an electronic pen) on the window 710 by contacting the window 710 by using a portion of their body (e.g., their finger). The window 710 may be formed of, for example, tempered glass, reinforced plastic, a flexible polymer material, etc., and may protect the display and an electronic device equipped with the display from an external shock. According to various embodiments of the present disclosure, the window 710 may be also referred to as a "glass window" or "cover window".

The touch sensor 730 may be disposed in the internal space between the front surface (e.g., the first surface) of the electronic device, on which the window 710 is disposed, and the rear surface (e.g., the second surface) of the housing of the electronic device. In the touch sensor 730, a specified physical quantity (e.g., a voltage, the amount of light, resistance, the amount of charge, capacitance, etc.) may vary due to a touch from the user.

For example, the touch sensor 730 may include a capacitive touch panel, a touch sensitive touch panel (or a resistive touch panel), an infrared touch panel, a piezo touch panel, etc. According to various embodiments of the present disclosure, the touch sensor 730 may be referred to by various names, such as a touch panel, etc., depending on the implementation shape.

According to various embodiments of the present disclosure, the display unit 740 may output content (e.g., a text, an image, a video, an icon, a widget, a symbol, etc.). For example, the display unit 740 may include a liquid crystal display (LCD) panel, a light-emitting diode (LED) display panel, an organic LED (OLED) display panel, a microelectromechanical systems (MEMS) display panel, or an electronic paper display panel.

According to various embodiments of the present disclosure, the display unit 740 may be integrated with the touch sensor 730 or the touch panel. In this case, the display unit 740 may be also referred to as a "touch screen panel (TSP)" or "touch screen display panel".

The pressure sensor 720 may be disposed, for example, in the internal space between the front surface (e.g., the first surface) of the electronic device, on which the window 710 is disposed, and the rear surface (e.g., the second surface) of the housing of the electronic device. The pressure sensor 720 may sense pressure or force from the outside (e.g., the finger of the user) against the window 710.

According to an embodiment of the present disclosure, the pressure sensor 720 may include a first electrode 721, a second electrode 723, and/or a dielectric layer 722. For example, the pressure sensor 720 may sense pressure of a touch based on capacitance between the first electrode 721 and the second electrode 723, which varies due to the touch.

According to an embodiment of the present disclosure, the first electrode 721 and/or the second electrode 723 may be implemented to be transparent or opaque. For example, if implemented to be opaque, the first electrode 721 and/or the second electrode 723 may include copper (Cu), silver (Ag), magnesium (Mg), titanium (Ti), or opaque graphene. Also, if the first electrode 721 and/or the second electrode 723 is implemented to be transparent, the first electrode 721 and/or the second electrode 723 may be formed of indium tin oxide (ITO), indium zinc oxide (IZO), Ag nanowire, metal mesh, transparent conducting polymer, or transparent graphene.

One of the first electrode 721 and the second electrode 723 may be implemented with one metal plate for ground, and the other thereof may be formed to have a repeated polygon pattern by using the above-described member (also known as a self-capacitance manner). One (e.g., a transmitter (Tx) terminal) of the first electrode 721 and the second electrode 723 may be implemented with a pattern extending in the first direction, and the other (e.g., a receiver (Rx) terminal) thereof may be implemented with a pattern extending in the second direction intersecting with the first direction at a specified angle (e.g., a right angle) (also known as a mutual-capacitance manner).

The dielectric layer 722 may include a dielectric material, for example, silicon foam, silicon membrane, optical clear adhesive (OCA), sponge, rubber, or polymer (e.g., polycarbonate, polyethylene terephthalate (PET), etc.).

When a touch input (e.g., a touch, hovering, or a force touch) is received from a user, the haptic actuator 750 may provide the user with a haptic feedback (e.g., vibration). To this end, the haptic actuator 750 may include a piezoelectric member and/or a vibration plate. The haptic actuator 750 may output a vibration pattern depending on at least one of the attributes of a pressure input or attributes of an object selected by the pressure input, under control of a processor 320.

The stacked structure of the display is an embodiment of the present disclosure and may be changed or modified. For example, the touch sensor 730 may be formed directly on the back surface of the window 710 (also known as a window integrated touch panel), may be inserted between the window 710 and the display unit 740 after being separately manufactured (also known as an add-on touch panel), may be formed directly on the display unit 740 (also known as an on-cell touch panel), or may be included within the display unit 740 (also known as an in-cell touch panel).

According to various embodiments of the present disclosure, the first electrode 721 of the pressure sensor 720 may be attached to the display unit 740 after being formed on a circuit board (e.g., a flexible printed circuit board (FPCB)), or may be directly formed on the rear surface of the display unit 740.

The electronic device 100 may measure the intensity of an external touch or pressure on the display by using the above-described structure and may generate a feedback based on the measured intensity of the touch or pressure.

FIGS. 8A and 8B are views illustrating a situation in which an electronic device adjusts the output of a speaker in response to an input of a force touch according to an embodiment of the present disclosure.

Referring to FIGS. 8A and 8B, the electronic device 100 according to an embodiment of the present disclosure may include one or more speakers. For example, the electronic device 100 may include the first speaker 110, the second speaker 120, the third speaker 130, and the fourth speaker 140. The speakers 110 to 140 may be placed on sides of a surface on which the display 50 of the electronic device 100 is placed.

The electronic device 100 may include the display 50 receiving a force touch input described with reference to FIGS. 7A and 7B as an input device. For example, the electronic device 100 may measure the intensity of pressure of a touch, which is input by the electronic pen 10 or a finger of a user, by using a pressure sensor 720 included in the display 50.

The electronic device 100 according to an embodiment of the present disclosure may adjust the output of the speakers 110 to 140 based on pressure by which the electronic pen 10 pushes the display 50, the location where an input of the electronic pen 10 is generated, and the locations of the speakers 110 to 140.

For example, the electronic device 100 may apply a small weight to a speaker adjacent to the current input location of the electronic pen 10 and may apply a greater weight to a speaker distant from the current input location of the electronic pen 10.

According to an embodiment of the present disclosure, in the case where the pressure by which the electronic pen 10 pushes the display 50 exceeds a preset value, the electronic device 100 may further increase the output of a speaker, which was previously adjusted based on the distances between the input location of the electronic pen 10 and the speakers 110 to 140. In the case where the pressure by which the electronic pen 10 pushes the display 50 is smaller than the preset value, the electronic device 100 may further decrease the output of a speaker, which is previously adjusted based on the distances between the input location of the electronic pen 10, and the speakers 110 to 140. A level of the pressure by which the electronic pen 10 pushes the display 50 may be subdivided according to a characteristic of the electronic device 100.

Referring to FIG. 8A, the electronic device 100 may receive pressure using the electronic pen 10. The electronic device 100 may receive, for example, a letter input by the electronic pen 10 while a memo input application is activated.

The electronic device 100 according to an embodiment of the present disclosure may output a sound effect, which is similar to sound generated when a letter is written on a paper, through the speakers 110 to 140 based on what letter is input. In this case, the electronic device 100 may adjust the output of a speaker producing a sound effect, based on the distance between the speaker and the location at which an input is made by the electronic pen 10.

In the case where the electronic pen 10 inputs letters "Gal", the electronic device 100 may increase the output of the first speaker 110 adjacent to the location at which the letters "Gal" are displayed and may adjust the speaker output to be higher in the order of the second speaker 120, the third speaker 130, and the fourth speaker 140.

Referring to FIG. 8B, the electronic device 100 may adjust the output of the speakers 110 to 140 based on the location where letters "laxy" are input and the locations of the speakers 110 to 140.

According to an embodiment of the present disclosure, the electronic device 100 may adjust the output of the speakers 110 to 140 based on pressure by which the electronic pen 10 pushes the display 50. For example, in the case where the electronic pen 10 inputs the letters "laxy" while pushing the display 50 by pressure of a preset value or more, the electronic device 100 may adjust the outputs of the speakers 110 to 140 to be higher.

In the case where the letters "laxy" are input, the electronic device 100 may adjust the output of the second speaker 120 to be larger and may adjust the speaker output to increase in the order of the first speaker 110, the fourth speaker 140, and the third speaker 130. In this case, if the letters "laxy" are input by pressure of the preset value or more, the electronic device 100 may adjust the output of all the speakers 110 to 140, the output of which are previously adjusted, to be higher.

However, embodiments of the present disclosure are not limited thereto. For example, if the letters "laxy" are input by pressure of the preset value or more, the electronic device 100 may adjust the output of the second speaker 120 adjacent to the letters "laxy" to be higher once more and may not adjust the output of the remaining speakers 110, 130, and 140.

According to various embodiments of the present disclosure, in the case where letters are input by pressure of the preset value or more, the electronic device 100 may display the input letters to be thicker than any other letter(s).

The electronic device 100 may adjust the speaker output based on the input location of an electronic pen, etc., locations of the speakers, and pressure by which the electronic pen, etc., pushes a display.

Figure 9:
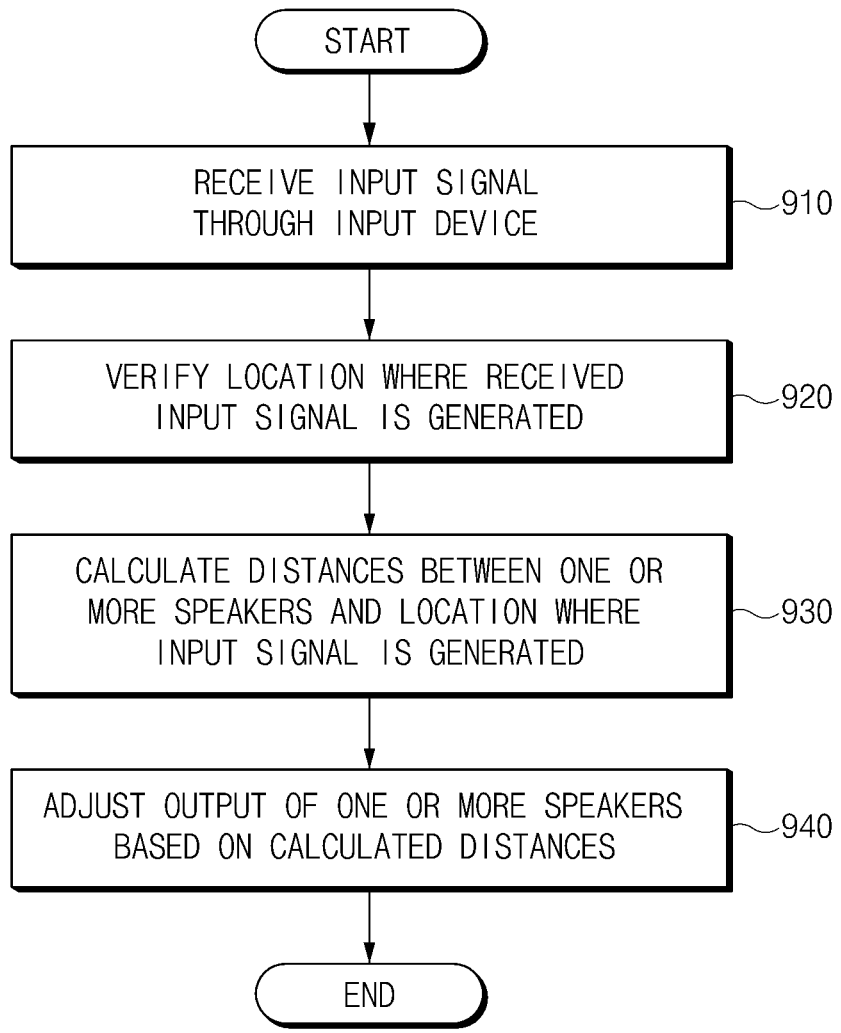
FIG. 9 is a flowchart of an operation in which the electronic device adjusts the output of a speaker based on the location of the speaker and the location at which an input signal is received, according to an embodiment of the present disclosure.

FIG. 9 is a flowchart of an operation in which an electronic device adjusts the output of a speaker based on the location of the speaker and the location at which an input signal is received, according to an embodiment of the present disclosure.

Referring to FIG. 9, in step 910, the electronic device 100 may receive an input signal from an input device. The input device may include, for example, a display capable of receiving a touch input, a physical key, an electronic pen, a sensor, etc.

In step 920, the electronic device 100 may determine the location at which the received input signal is generated. In step 930, the electronic device 100 may calculate the distance between at least one speaker and the location at which the received input signal input is generated. For example, in the case where an input is generated at one point of a display, the electronic device 100 may calculate the distance between the point and a speaker. The location of the speaker may correspond to a preset point on the display adjacent to a region where the speaker is installed. However, embodiments of the present disclosure are not limited thereto.

In step 940, the electronic device 100 may adjust the output of one or more speakers based on the calculated distance. For example, the electronic device 100 may determine a weight based on the calculated distance and may apply the determined weight to an amplifier connected with the speaker.

Figure 10:
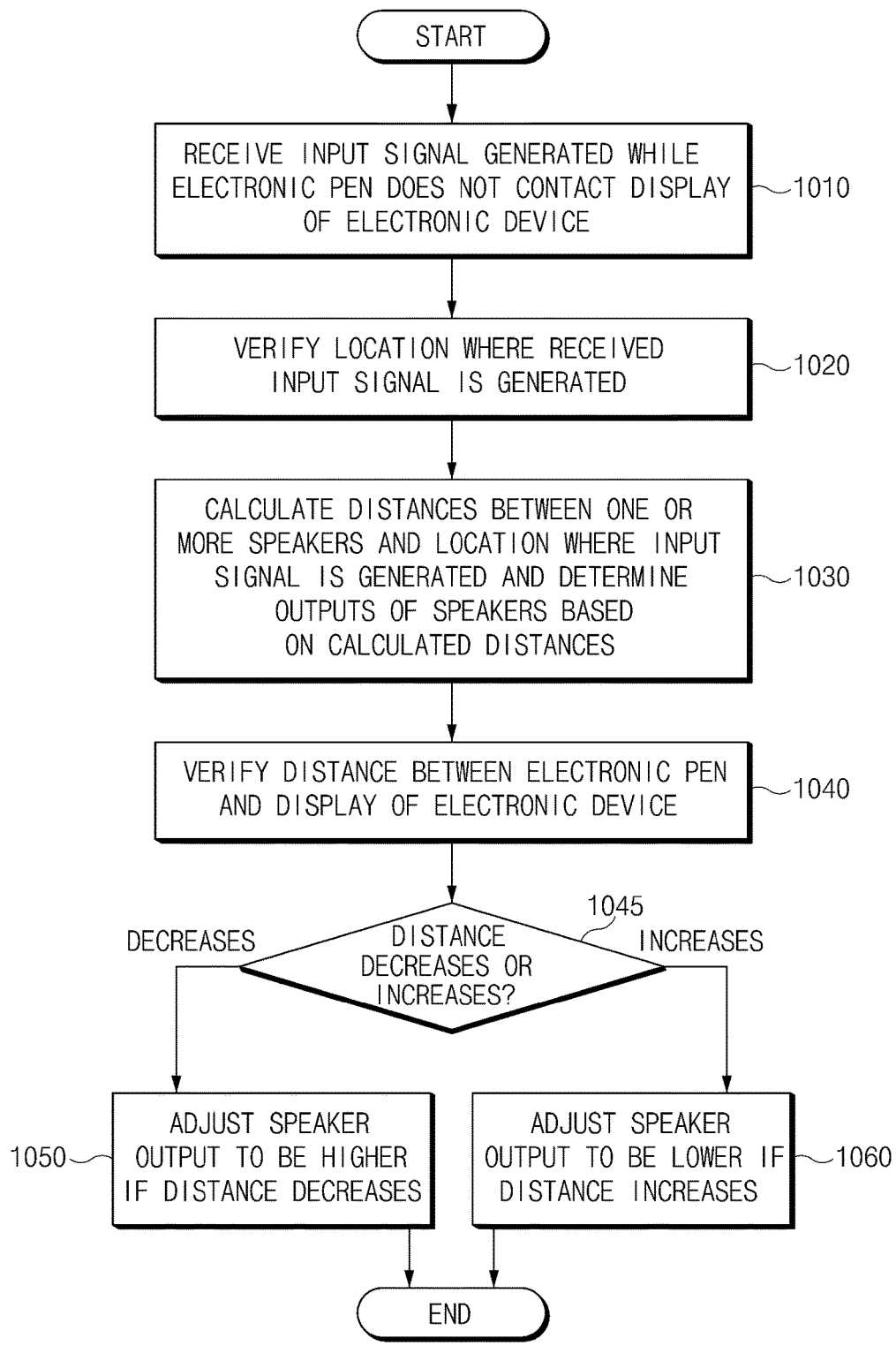
FIG. 10 is a flowchart of an operation in which the electronic device adjusts the output of a speaker based on the location of the speaker and the location at which a hovering signal is received, according to an embodiment of the present disclosure.

FIG. 10 is a flowchart of an operation in which an electronic device adjusts the output of a speaker based on the location of the speaker and the location at which a hovering signal is received according to an embodiment of the present disclosure.

Referring to FIG. 10, in step 1010, the electronic device 100 may receive, through an input device, an input signal generated in a state where an electronic pen does not contact a display of the electronic device 100. For example, the electronic device 100 may receive a signal generated in a state where the electronic pen is hovering on the display. The input device may include, for example, a display capable of receiving a touch input, a physical key, an electronic pen, a sensor, etc.

In step 1020, the electronic device 100 may determine the location at which the received input signal input is generated. In step 1030, the electronic device 100 may calculate the distances between at least one or more speakers, and the location at which the received input signal is generated and may determine the speaker output based on the calculated distance.

In step 1040, the electronic device 100 may determine the distance between the electronic pen and the display included in the electronic device 100. That is, the electronic device 100 may determine a change in the distance from the hovering pen.

In step 1045, the electronic device 100 may determine whether the distance between the electronic pen and the display increases or decreases.

In step 1050, if the distance between the electronic pen and the display decreases, the electronic device 100 may adjust the output determined in step 1030 to be higher.

In step 1060, if the distance between the electronic pen and the display increases, the electronic device 100 may adjust the output determined in step 1030 to be lower.

As such, the electronic device 100 may adjust the speaker output based on a change in the distance between the hovering electronic pen and the electronic device 100.

The hovering operation is not limited to an operation between the electronic device 100 and the electronic pen. For example, the hovering operation can be changed or modified through various embodiments of the present disclosure. For example, the hovering operation may be possible between a portion of a user's body (e.g., the user's finger or palm) and an electronic device. In this case, the electronic device 100 may adjust the speaker output as described above.

Figure 11:
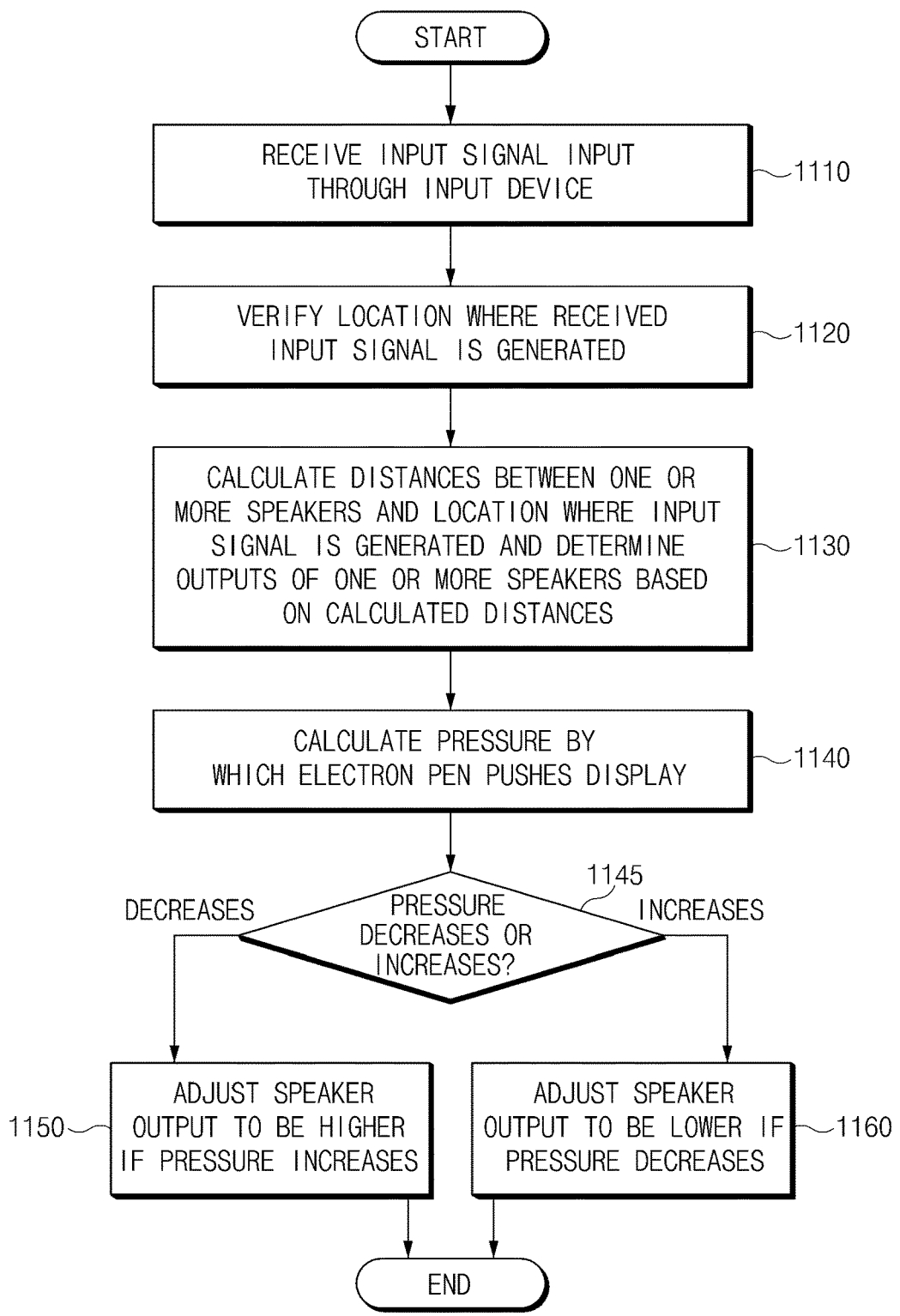
FIG. 11 is a flowchart of an operation in which the electronic device adjusts the output of a speaker based on the intensity of pressure by which an electronic pen is applied to the electronic device, according to an embodiment of the present disclosure.

FIG. 11 is a flowchart of an operation in which an electronic device adjusts the output of a speaker based on the intensity of the pressure by which an electronic pen is applied to the electronic device according to an embodiment of the present disclosure.

Referring to FIG. 11, in step 1110, the electronic device 100 may receive an input signal from an input device. The input device may include, for example, a display capable of receiving a touch input, a physical key, an electronic pen, a sensor, etc.

In step 1120, the electronic device 100 may determine the location at which the received input signal is generated. Referring to step 1130, the electronic device 100 may calculate the distance between at least one speaker and the location at which the received input signal is generated and may determine the output of one or more speakers based on the calculated distance. For example, the electronic device 100 may determine a weight based on the calculated distance and may apply the determined weight to an amplifier circuit that is driving the speaker.

In step 1140, the electronic device 100 may calculate pressure by which the electronic pen pushes a display of the electronic device 100. However, an object pushing the display is not limited to the electronic pen. For example, the electronic device 100 may calculate pressure by which a portion of a user's body (e.g., the user's finger or palm) pushes the display.

In step 1145, the electronic device 100 may determine whether the calculated pressure increases or decreases.

In step 1150, if the calculated pressure increases, the electronic device 100 may adjust the output determined in step 1030 to be higher.

In step 1160, if the calculated pressure decreases, the electronic device 100 may adjust the output determined in step 1030 to be lower once more.

As such, the electronic device 100 may adjust the speaker output based on a change in external pressure applied to the electronic device 100.

Figure 12:
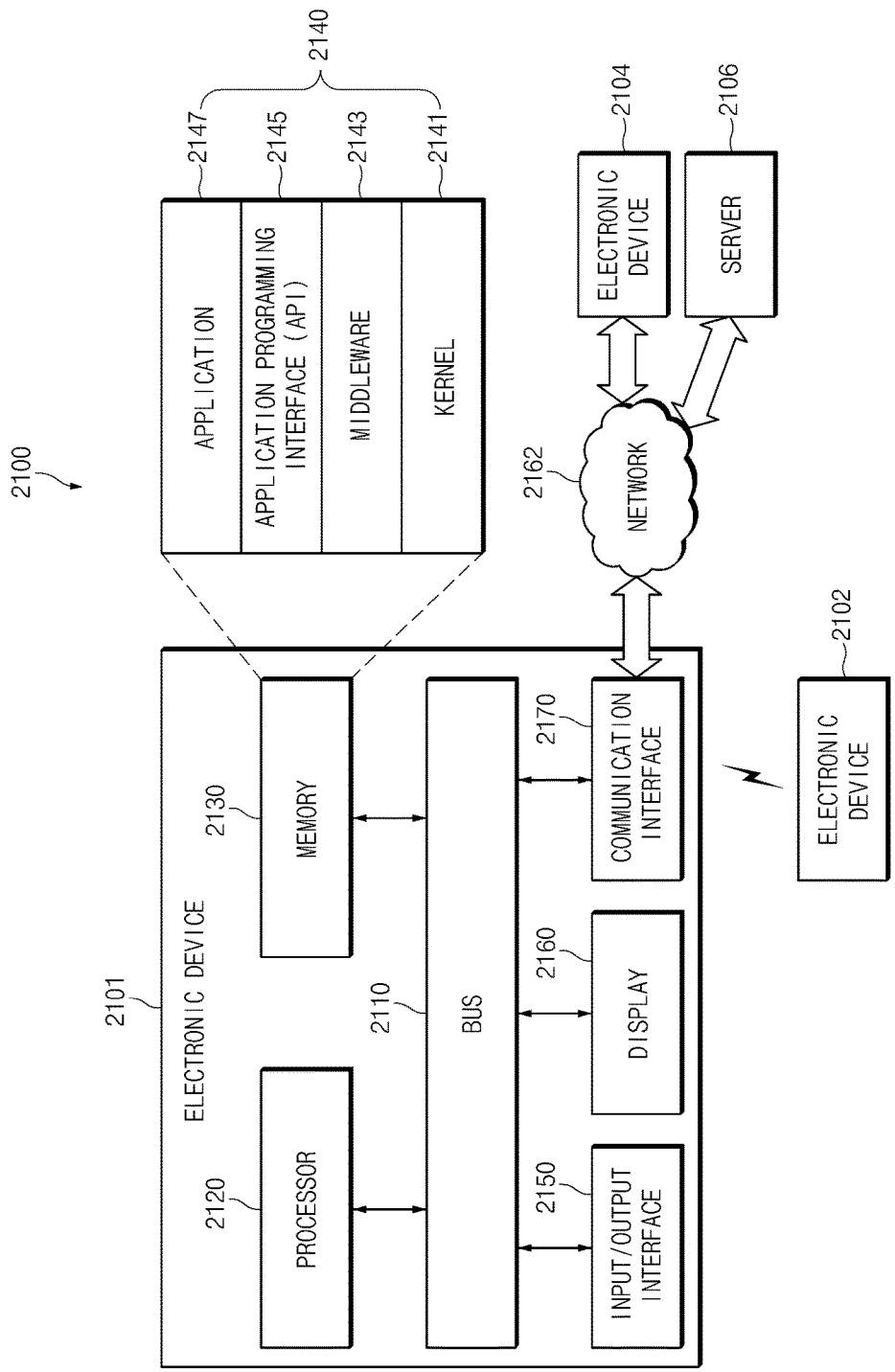
FIG. 12 is a view illustrating the electronic device in a network environment, according to various embodiments of the present disclosure.

Referring to FIG. 12, according to various embodiments of the present disclosure, an electronic device 2101 in a network environment 2100 is described. The electronic device 2101 may include a bus 2110, a processor 2120, a memory 2130, an input/output interface 2150, a display 2160, and a communication interface 2170. The electronic device 2101 may omit at least one of the above-described elements or may further include other elements. The bus 2110 may interconnect the above-described elements 2120 to 2170 and may include a circuit for conveying communications (e.g., a control message and/or data) among the above-described elements. The processor 2120 may include one or more of a CPU, an AP or a communication processor (CP). For example, the processor 2120 may perform an arithmetic operation or data processing associated with control and/or communication of at least other elements of the electronic device 2101.

The memory 2130 may include a volatile and/or nonvolatile memory. For example, the memory 2130 may store instructions or data associated with at least one other element of the electronic device 2101. According to an embodiment of the present disclosure, the memory 2130 may store software and/or a program 2140. The program 2140 may include, for example, a kernel 2141, a middleware 2143, an application programming interface (API) 2145, and/or applications 2147. At least a part of the kernel 2141, the middleware 2143, or the API 2145 may be referred to as an OS. For example, the kernel 2141 may control or manage system resources (e.g., the bus 2110, the processor 2120, the memory 2130, etc.) that are used to execute operations or functions of other programs (e.g., the middleware 2143, the API 2145, and applications 2147). Furthermore, the kernel 2141 may provide an interface that allows the middleware 2143, the API 2145, or the applications 2147 to access elements of the electronic device 2101 to control or manage system resources.

The middleware 2143 may perform, for example, an intermediary role such that the API 2145 or the applications 2147 can communicate with the kernel 2141 to exchange data. Furthermore, the middleware 2143 may process one or more task requests received from the applications 2147 according to a priority. For example, the middleware 2143 may assign the priority, which makes it possible to use a system resource (e.g., the bus 2110, the processor 2120, the memory 2130, etc.) of the electronic device 2101, to at least one of the applications 2147 and may process the one or more task requests. The API 2145 may be an interface through which the applications 2147 control a function provided by the kernel 2141 or the middleware 2143, and may include, for example, at least one interface or function (e.g., an instruction) for file control, window control, image processing, character control, etc. The input/output interface 2150 may transmit an instruction or data input from a user or another external device, to another element of the electronic device 2101 or may output an instruction or data, received from another element of the electronic device 2101, to a user or another external device.

The display 2160 may include, for example, an LCD, an LED display, an OLED display, a MEMS display, or an electronic paper display. The display 2160 may display, for example, various content (e.g., a text, an image, a video, an icon, a symbol, etc.) to a user. The display 2160 may include a touch screen and may receive, for example, a touch, a gesture, or a proximity or hovering input using an electronic pen or a part of a user's body.

The communication interface 2170 may establish communication between the electronic device 2101 and an external device (e.g., the first electronic device 2102, the second electronic device 2104, or the server 2106). For example, the communication interface 2170 may be connected to the network 2162 over wireless communication or wired communication to communicate with the external device.

The wireless communication may include cellular communication using at least one of LTE, LTE-A, CDMA, WCDMA, UMTS, WiBro, GSM, or etc. The wireless communication may include at least one of Wi-Fi, Bluetooth, BLE, Zigbee, NFC, magnetic stripe transmission (MST), RF, a BAN, etc. According to an embodiment of the present disclosure, the wireless communication may include global navigation satellite system (GNSS). The GNSS may be one of, for example, a global positioning system (GPS), a global navigation satellite system (Glonass), a Beidou navigation satellite system (Beidou), or an European global satellite-based navigation system (Galileo). Hereinafter, in the present disclosure, the term "GPS" and the term "GNSS" may be interchangeably used. The wired communication may include at least one of, for example, a USB, a HDMI, a RS-232, powerline communication, a POTS, etc. The network 2162 may include at least one of telecommunications networks, for example, a computer network (e.g., LAN or WAN), an Internet, or a telephone network.

Each of the first and second external electronic devices 2102 and 2104 may be a device of which the type is different from or the same as that of the electronic device 2101. According to various embodiments of the present disclosure, all or a portion of operations that the electronic device 2101 will perform may be executed by another or plurality of electronic devices (e.g., the first electronic device 2102, the second electronic device 2104, or the server 2106). In the case where the electronic device 2101 executes any function or service automatically or in response to a request, the electronic device 2101 may not perform the function or the service internally, but, alternatively or additionally, it may request at least a portion of a function associated with the electronic device 2101 from another electronic device. The other electronic device may execute the requested function or an additional function, and may transmit the execution result to the electronic device 2101. The electronic device 2101 may provide the requested function or service using the received result or may additionally process the received result to provide the requested function or service. To this end, for example, cloud computing, distributed computing, or client-server computing may be used.

Figure 13:
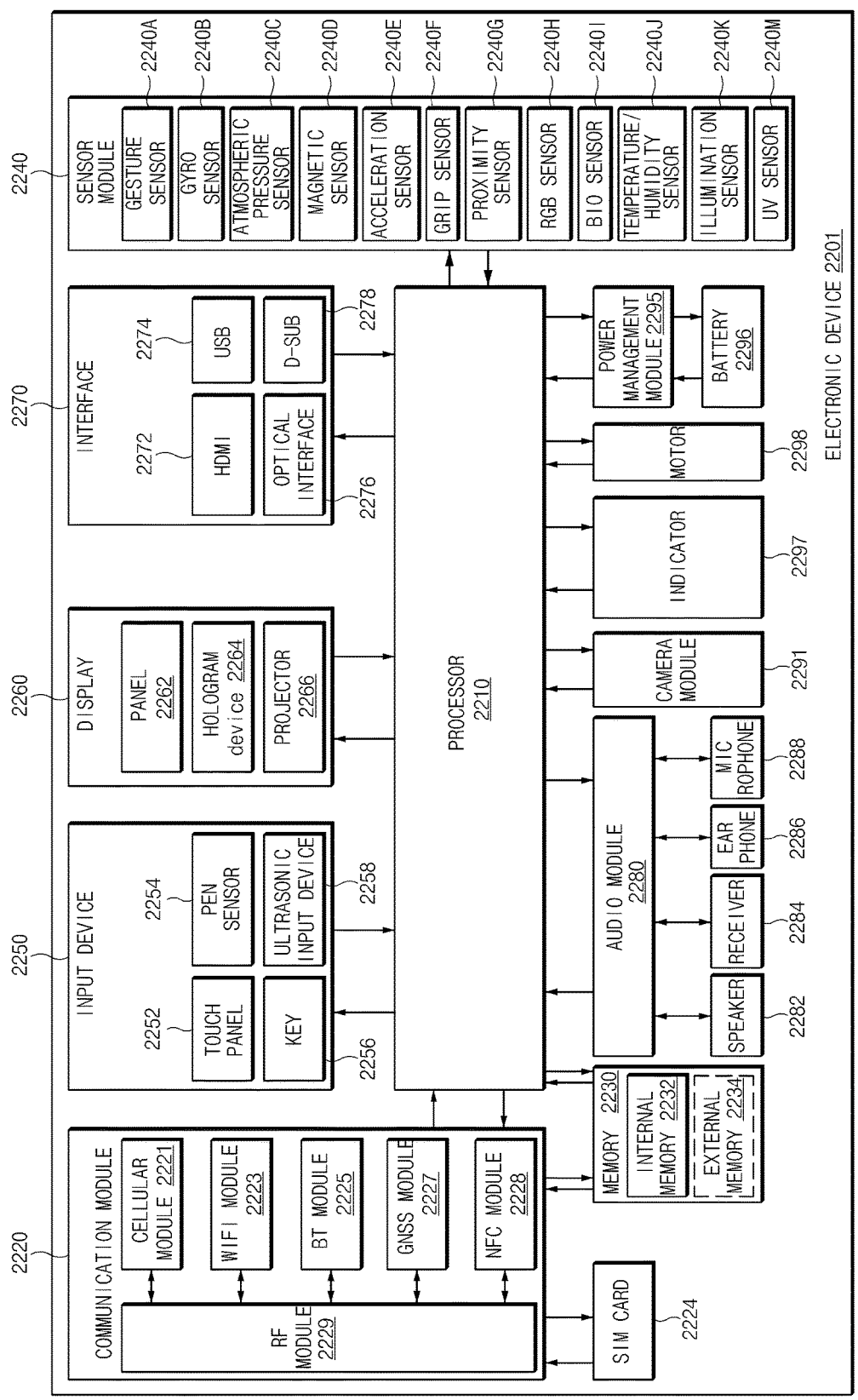
FIG. 13 illustrates a block diagram of the electronic device, according to various embodiments of the present disclosure.

FIG. 13 illustrates a block diagram of an electronic device, according to various embodiments of the present disclosure. An electronic device 2201 may include, for example, all or a part of the electronic device 2101. The electronic device 2201 may include one or more processors 2210 (e.g., an AP), a communication module 2220, a subscriber identification module (SIM) 2224, a memory 2230, a sensor module 2240, an input device 2250, a display 2260, an interface 2270, an audio module 2280, a camera module 2291, a power management module 2295, a battery 2296, an indicator 2297, and a motor 2298. The processor 2210 may be implemented with a system on chip (SoC). The processor 2210 may further include a graphic processing unit (GPU) and/or an image signal processor (ISP). The processor 2210 may include at least a part (e.g., a cellular module 2221) of elements of electronic device 2101. The processor 2210 may load an instruction or data, which is received from at least one of other elements (e.g., a nonvolatile memory), into a volatile memory and process the loaded instruction or data. The processor 2210 may store result data in the nonvolatile memory.

The communication module 2220 may be configured the same as or similar to the communication interface 2170. The communication module 2220 may include the cellular module 2221, a Wi-Fi module 2223, a Bluetooth (BT) module 2225, a GNSS module 2227, a NFC module 2228, and a RF module 2229. The cellular module 2221 may provide, for example, voice communication, video communication, a character service, an Internet service, etc. over a communication network. According to an embodiment of the present disclosure, the cellular module 2221 may perform discrimination and authentication of the electronic device 2201 within a communication network by using the SIM 2224 (e.g., a SIM card). The cellular module 2221 may perform at least a portion of functions that the processor 2210 provides. The cellular module 2221 may include a CP. At least a part (e.g., two or more) of the cellular module 2221, the Wi-Fi module 2223, the BT module 2225, the GNSS module 2227, or the NFC module 2228 may be included within one IC or an IC package. The RF module 2229 may transmit and receive a communication signal (e.g., an RF signal). The RF module 2229 may include a transceiver, a power amplifier module (PAM), a frequency filter, a low noise amplifier (LNA), an antenna, etc. At least one of the cellular module 2221, the Wi-Fi module 2223, the BT module 2225, the GNSS module 2227, or the NFC module 2228 may transmit and receive an RF signal through a separate RF module. The SIM 2224 may include, for example, a card and/or embedded SIM that includes a SIM and may include unique identify information (e.g., integrated circuit card identifier (ICCID)) or subscriber information (e.g., international mobile subscriber identity (IMSI)).

The memory 2230 may include an internal memory 2232 or an external memory 2234. For example, the internal memory 2232 may include at least one of a volatile memory (e.g., a dynamic random access memory (DRAM), a static RAM (SRAM), a synchronous DRAM (SDRAM), etc.), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 2234 may include a flash drive such as compact flash (CF), secure digital (SD), micro secure digital (Micro-SD), mini secure digital (Mini-SD), extreme digital (xD), a multimedia card (MMC), a memory stick, etc. The external memory 2234 may be operatively and/or physically connected to the electronic device 2201 through various interfaces.

The sensor module 2240 may measure, for example, a physical quantity or may detect an operation state of the electronic device 2201. The sensor module 2240 may convert the measured or detected information to an electric signal. For example, the sensor module 2240 may include at least one of a gesture sensor 2240A, a gyro sensor 2240B, a barometric pressure sensor 2240C, a magnetic sensor 2240D, an acceleration sensor 2240E, a grip sensor 2240F, the proximity sensor 2240G, a color sensor 2240H (e.g., red, green, blue (RGB) sensor), a biometric sensor 2240I, a temperature/humidity sensor 2240J, an illuminance sensor 2240K, or an UV sensor 2240M. Although not illustrated, additionally or generally, the sensor module 2240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2240 may further include a control circuit for controlling at least one or more sensors included therein. According to an embodiment of the present disclosure, the electronic device 2201 may further include a processor that is a part of the processor 2210 or independent of the processor 2210, and is configured to control the sensor module 2240. The processor may control the sensor module 2240 while the processor 2210 remains in a sleep state.

The input device 2250 may include, for example, a touch panel 2252, a (digital) pen sensor 2254, a key 2256, or an ultrasonic input unit 2258. The touch panel 2252 may use at least one of capacitive, resistive, infrared, and ultrasonic detecting methods. Also, the touch panel 2252 may further include a control circuit. The touch panel 2252 may further include a tactile layer to provide a tactile reaction to a user. The (digital) pen sensor 2254 may be, for example, a part of a touch panel or may include an additional sheet for recognition. The key 2256 may include, for example, a physical button, an optical key, or a keypad. The ultrasonic input device 2258 may detect (or sense) an ultrasonic signal, which is generated from an input device, through a microphone 2288 and may check data corresponding to the detected ultrasonic signal.

The display 2260 may include a panel 2262, a hologram device 2264, a projector 2266, and/or a control circuit for controlling the panel 2262, the hologram device 2264, or the projector 2266. The panel 2262 may be implemented, for example, to be flexible, transparent, or wearable. The panel 2262 and the touch panel 2252 may be integrated into a single module. According to an embodiment of the present disclosure, the panel 2262 may include a pressure sensor (or force sensor) that measures the intensity of touch pressure by a user. The pressure sensor may be integrated with the touch panel 2252, or may be implemented as at least one sensor separate from the touch panel 2252. The hologram device 2264 may display a stereoscopic image in a space using a light interference phenomenon. The projector 2266 may project light onto a screen to display an image. For example, the screen may be arranged in the inside or the outside of the electronic device 2201.

The interface 2270 may include, for example, a HDMI 2272, a USB 2274, an optical interface 2276, or a D-subminiature (D-sub) 2278. The interface 2270 may be included, for example, in the communication interface 2170. Additionally or generally, the interface 2270 may include, for example, a mobile high definition link (MHL) interface, a SD card/MMC interface, or an Infrared Data Association (IrDA) standard interface.

The audio module 2280 may convert a sound and an electric signal in dual directions. At least a part of the audio module 2280 may be included, for example, in the input/output interface 2150. The audio module 2280 may process, for example, sound information that is input or output through a speaker 2282, a receiver 2284, an earphone 2286, or the microphone 2288.

The camera module 2291 may shoot a still image or a video. According to an embodiment of the present disclosure, the camera module 2291 may include at least one or more image sensors (e.g., a front sensor or a rear sensor), a lens, an ISP, or a flash (e.g., an LED or a xenon lamp).

The power management module 2295 may manage, for example, power of the electronic device 2201. According to an embodiment of the present disclosure, a power management integrated circuit (PMIC), a charger IC, or a battery gauge may be included in the power management module 2295. The PMIC may have a wired charging method and/or a wireless charging method. The wireless charging method may include, for example, a magnetic resonance method, a magnetic induction method, or an electromagnetic method and may further include an additional circuit, for example, a coil loop, a resonant circuit, a rectifier, etc. The battery gauge may measure, for example, a remaining capacity of the battery 2296, and a voltage, current, or temperature thereof while the battery is charged. The battery 2296 may include, for example, a rechargeable battery and/or a solar battery.

The indicator 2297 may display a specific state of the electronic device 2201 or a part thereof (e.g., the processor 2210), such as a booting state, a message state, a charging state, etc. The motor 2298 may convert an electrical signal into a mechanical vibration and may generate the following effects: vibration, haptic, etc. The electronic device 2201 may include a processing device (e.g., a GPU) for supporting a mobile TV. The processing device for supporting the mobile TV may process media data according to the standards of digital multimedia broadcasting (DMB), digital video broadcasting (DVB), MediaFLO™, etc. Each of the above-mentioned elements of the electronic device according to various embodiments of the present disclosure may be configured with one or more components, and the names of the elements may be changed according to the type of the electronic device. Some elements of the electronic device 2201 may be omitted or other additional elements may be added. Furthermore, some of the elements of the electronic device may be combined with each other to form one entity, so that the functions of the elements may be performed in the same manner as before the combination.

Figure 14:
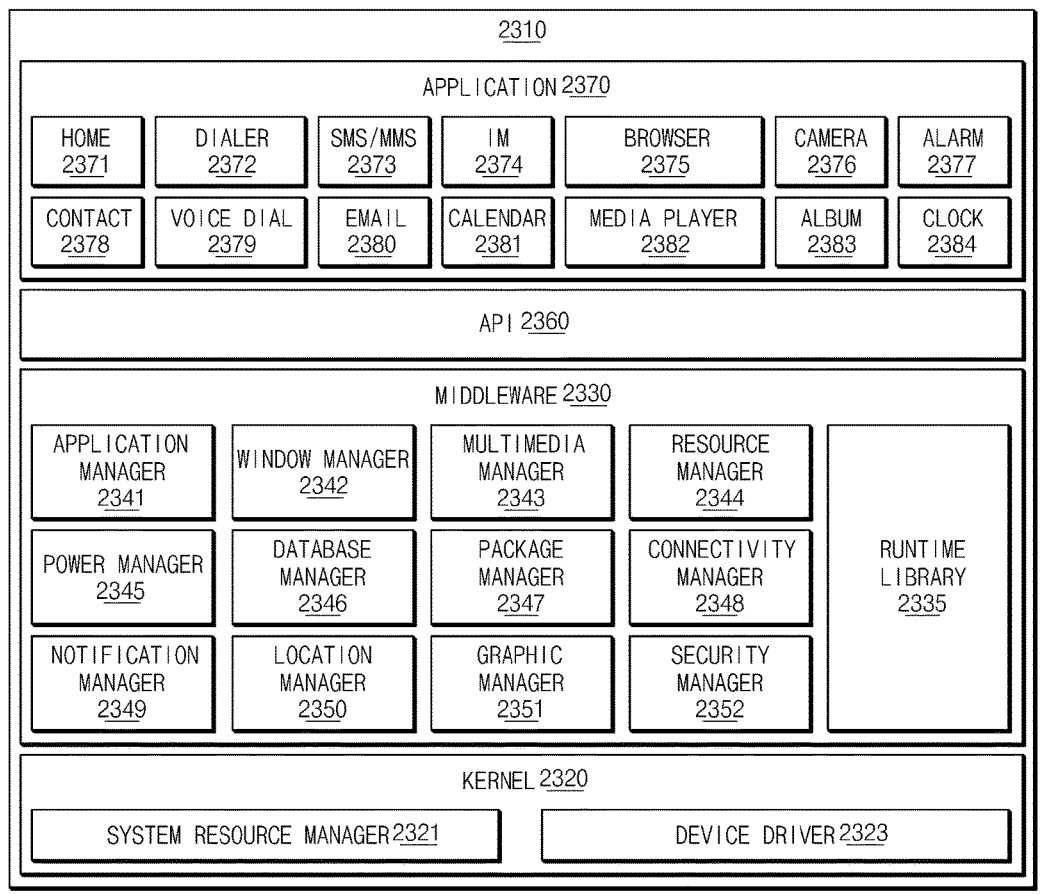
FIG. 14 illustrates a block diagram of a program module, according to various embodiments of the present disclosure.

FIG. 14 illustrates a block diagram of a program module, according to various embodiments of the present disclosure. A program module 2310 may include an OS to control resources associated with an electronic device 2101, and/or applications driven on the OS. The OS may be, for example, Android™, iOS™, Windows™, Symbian™, Tizen™, or Bada™. The program module 2310 may include a kernel 2320, a middleware 2330, an API 2360, and/or an application 2370. At least a portion of the program module 2310 may be preloaded on an electronic device or may be downloadable from an external electronic device (e.g., the first electronic device 2102, the second electronic device 2104, the server 2106, etc.).

The kernel 2320 may include, for example, a system resource manager 2321 or a device driver 2323. The system resource manager 2321 may control, allocate, or retrieve system resources. According to an embodiment of the present disclosure, the system resource manager 2321 may include a process managing unit, a memory managing unit, a file system managing unit, etc. The device driver 2323 may include, for example, a display driver, a camera driver, a Bluetooth driver, a shared memory driver, a USB driver, a keypad driver, a Wi-Fi driver, an audio driver, or an inter-process communication (IPC) driver. The middleware 2330 may provide, for example, a function that the application 2370 needs in common, or may provide functions to the application 2370 through the API 2360 to allow the application 2370 to efficiently use limited system resources of the electronic device. The middleware 2330 may include at least one of a runtime library 2335, an application manager 2341, a window manager 2342, a multimedia manager 2343, a resource manager 2344, a power manager 2345, a database manager 2346, a package manager 2347, a connectivity manager 2348, a notification manager 2349, a location manager 2350, a graphic manager 2351, or a security manager 2352.

The runtime library 2335 may include, for example, a library module that is used by a compiler to add a new function through a programming language while the application 2370 is being executed. The runtime library 2335 may perform input/output management, memory management, or capacities about arithmetic functions. The application manager 2341 may manage, for example, a life cycle of at least one application of the application 2370. The window manager 2342 may manage a graphic user interface (GUI) resource that is used in a screen. The multimedia manager 2343 may identify a format necessary for playing media files, and may perform encoding or decoding of media files by using a codec suitable for the format. The resource manager 2344 may manage resources such as a memory space or source code of the application 2370. The power manager 2345 may manage a battery or power, and may provide power information for an operation of an electronic device. According to an embodiment of the present disclosure, the power manager 2345 may operate with a basic input/output system (BIOS). The database manager 2346 may generate, search for, or modify database that is to be used in the application 2370. The package manager 2347 may install or update an application that is distributed in the form of package file.

The connectivity manager 2348 may manage, for example, wireless connection. The notification manager 2349 may provide an event, for example, arrival message, appointment, or proximity notification to a user. For example, the location manager 2350 may manage location information about an electronic device. The graphic manager 2351 may manage a graphic effect that is provided to a user, or manage a user interface relevant thereto. The security manager 2352 may provide, for example, system security or user authentication. According to an embodiment of the present disclosure, the middleware 2330 may include a telephony manager for managing a voice or video call function of the electronic device or a middleware module that combines diverse functions of the above-described elements. The middleware 2330 may provide a module specialized to each OS kind to provide differentiated functions. Additionally, the middleware 2330 may dynamically remove a part of the preexisting elements or may add new elements thereto. The API 2360 may be, for example, a set of programming functions and may be provided with a configuration that is variable depending on an OS. For example, in the case where an OS is the Android or the iOS, it may provide one API set per platform. In the case where an OS is the Tizen, it may provide two or more API sets per platform.

The application 2370 may include, for example, applications such as a home application 2371, a dialer application 2372, an SMS/MMS application 2373, an instant message (IM) application 2374, a browser application 2375, a camera application 2376, an alarm application 2377, a contact application 2378, a voice dial application 2379, an e-mail application 2380, a calendar application 2381, a media player application 2382, an album application 2383, a clock application 2384, a healthcare application (e.g., measuring an exercise quantity, blood sugar level, etc.), or offering of environment information application (e.g., information of barometric pressure, humidity, temperature, etc.). According to an embodiment of the present disclosure, the application 2370 may include an information exchanging application to support information exchange between an electronic device and an external electronic device. The information exchanging application may include, for example, a notification relay application for transmitting specific information to an external electronic device, or a device management application for managing the external electronic device. For example, the notification relay application may include a function of transmitting notification information, which arise from other applications, to an external electronic device or may receive, for example, notification information from an external electronic device and provide the notification information to a user. The device management application may install, delete, or update for example, a function (e.g., turn-on/turn-off of an external electronic device or a part of the electronic device components, or adjustment of brightness or resolution of a display) of the external electronic device which communicates with the electronic device, and an application running in the external electronic device. The application 2370 may include an application (e.g., a healthcare application of a mobile medical device) that is assigned in accordance with an attribute of an external electronic device. The application 2370 may include an application that is received from an external electronic device. At least a portion of the program module 2310 may be implemented by software, firmware, hardware, or a combination of two or more thereof, and may include modules, programs, routines, instruction sets, processes, or etc. for performing one or more functions.

The term "module" used in the present disclosure may include a unit composed of hardware, software, and firmware and may be interchangeably used with the terms "unit", "logic", "logical block", "component", and "circuit". The "module" may be an integrated component or may be a minimum unit for performing one or more functions or a part thereof. The "module" may be implemented mechanically or electronically and may include at least one of an application specific IC (ASIC) chip, a field programmable gate array (FPGA), and a programmable-logic device for performing some operations, which are known or will be developed. At least a part of an apparatus (e.g., modules or functions thereof) or a method (e.g., operations) according to various embodiments of the present disclosure may be, for example, implemented by instructions stored in computer-readable storage media in the form of a program module. The instruction, when executed by a processor, may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a DVD, a magneto-optical media (e.g., a floptical disk)), and an internal memory. Also, a program instruction may include not only an assembly code such as things generated by a compiler but also a high-level language code executable using an interpreter. A module or a program module may include at least one of the above elements, or a part of the above elements may be omitted, or other elements may be further included. Operations performed by a module, a program module, or other elements may be executed sequentially, in parallel, repeatedly, or in a heuristic method, or some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
    a speaker;
    an input device; and
    a processor electrically connected with the speaker and the input device,
    wherein the processor is configured to:
        determine a generation location of an input signal received through the input device;
        calculate a distance between the generation location of the input signal and a location of the speaker; and
        adjust an output of the speaker based on the calculated distance.
2. The electronic device of claim 1, wherein the input device includes at least one of a touch panel, a pen sensor, a physical key, and an ultrasonic input unit.
3. The electronic device of claim 1, further comprising:
    a display,
    wherein the processor is configured to:
        set a specified point, which is adjacent to the speaker, of a region of the display to the location of the speaker.
4. The electronic device of claim 3, wherein the processor is further configured to:
    adjust the output of the speaker based on a distance between the generation location of the input signal and the specified point relative to a distance from the specified point to a central point of the display.

5. The electronic device of claim 3, wherein the processor is further configured to:
divide the display into a plurality of regions; and
adjust the output of the speaker based on locations of the plurality of divided regions and the location of the speaker.

6. The electronic device of claim 1, wherein the processor is further configured to:
adjust the output of the speaker to increase if the generation location of the input signal moves in a direction in which a distance from the location of the speaker decreases; and
adjust the output of the speaker to decrease if the generation location of the input signal moves in a direction in which the distance from the location of the speaker increases.

7. The electronic device of claim 1, further comprising:
a communication module,
wherein the processor is configured to:
establish communication with an external electronic device using the communication module; and
adjust an output of a speaker included in the external electronic device based on a location of the speaker of the external electronic device and the generation location of the input signal received in the electronic device.

8. The electronic device of claim 1, wherein the processor is further configured to:
adjust the output of the speaker based on a generation location of the hovering signal, if the input signal received through the input device is a hovering signal.

9. The electronic device of claim 1, wherein the processor is further configured to:
adjust the output of the speaker based on a height of the hovering signal, if the input signal received through the input device is a hovering signal.

10. The electronic device of claim 1, wherein the input device includes a pressure sensor configured to sense the intensity of pressure applied to the input device, and
wherein the processor is configured to:
adjust the output of the speaker based on the intensity of the pressure.

11. A controlling method of an electronic device which includes an input device and a speaker, the method comprising:
receiving an input signal through the input device;
determining a generation location of the received input signal;
calculating a distance between the generation location of the input signal and a location where the speaker is disposed; and
adjusting an output of the speaker based on the calculated distance.

12. The method of claim 11, further comprising:
setting a specified point, which is adjacent to the speaker, of a region of a display included in the electronic device to the location of the speaker.

13. The method of claim 12, wherein adjusting the output of the speaker includes:
adjusting the output of the speaker based on a distance between the generation location of the input signal and the specified point relative to a distance from the specified point to a central point of the display.

14. The method of claim 12, wherein adjusting the output of the speaker includes:
dividing the display into a plurality of regions; and
adjusting the output of the speaker based on locations of the plurality of divided regions and the location of the speaker.

15. The method of claim 11, wherein adjusting the output of the speaker includes:
adjusting the output of the speaker to increase when the generation location of the input signal moves in a direction in which a distance from the location of the speaker decreases; and
adjusting the output of the speaker to decrease when the generation location of the input signal moves in a direction in which the distance from the location of the speaker increases.

16. The method of claim 11, further comprising:
establishing communication with an external electronic device using a communication module included in the electronic device; and
adjusting an output of a speaker included in the external electronic device based on a location of the speaker of the external electronic device and a generation location of an input signal received in the electronic device.

17. The method of claim 11, further comprising:
when the input signal received through the input device is a hovering signal, adjusting the output of the speaker based on a generation location of the hovering signal.

18. The method of claim 11, further comprising:
when the input signal received through the input device is a hovering signal, adjusting the output of the speaker based on a generation height of the hovering signal.

19. The method of claim 11, further comprising:
sensing the intensity of pressure applied to the input device, and
adjusting the output of the speaker based on the intensity of the pressure.

20. A storage medium which stores instructions performing a controlling method of an electronic device including an input device and a speaker, the controlling method including:
receiving an input signal through the input device;
determining a generation location of the received input signal;
calculating a distance between the generation location of the input signal and a location where the speaker is disposed; and
adjusting an output of the speaker based on the calculated distance.

* * * * *